US012084633B2

(12) United States Patent
Coletta et al.

(10) Patent No.: US 12,084,633 B2
(45) Date of Patent: Sep. 10, 2024

(54) UNIT DOSE LAUNDRY DETERGENT COMPOSITIONS CONTAINING SOIL RELEASE POLYMERS

(71) Applicant: Henkel IP & Holding GmbH, Düsseldorf (DE)

(72) Inventors: Jennifer Diane Coletta, West Haven, CT (US); Sarah Anne Elliott, Trumbull, CT (US); Jeff Michael Gardner, Trumbull, CT (US); Kristen Marie Higgins, Trumbull, CT (US); Daniel Thomas Piorkowski, Fairfield, CT (US); Napaporn Komesvarakul Slattery, Monroe, CT (US); Joseph D. Dahlmeyer, Jr., East Haven, CT (US)

(73) Assignee: HENKEL AG & CO. KGAA, Duesseldorf (DE)

( * ) Notice: Subject to any disclaimer, the term of this patent is extended or adjusted under 35 U.S.C. 154(b) by 22 days.

(21) Appl. No.: 17/549,411

(22) Filed: Dec. 13, 2021

(65) Prior Publication Data

US 2022/0186144 A1 Jun. 16, 2022

Related U.S. Application Data

(60) Provisional application No. 63/199,227, filed on Dec. 15, 2020.

(51) Int. Cl.

*C11D 3/37* (2006.01)
*C11D 1/14* (2006.01)
(Continued)

(52) U.S. Cl.

CPC ............ *C11D 3/3715* (2013.01); *C11D 1/143* (2013.01); *C11D 1/72* (2013.01); *C11D 3/2044* (2013.01);
(Continued)

(58) Field of Classification Search

CPC .... C11D 3/3715; C11D 11/0017; C11D 1/143
See application file for complete search history.

(56) References Cited

U.S. PATENT DOCUMENTS

| | | | |
|---|---|---|---|
| 3,812,041 | A | 5/1974 | Inamorato |
| 4,482,792 | A | 11/1984 | Geremia |

(Continued)

FOREIGN PATENT DOCUMENTS

| | | | |
|---|---|---|---|
| CA | 1293905 | C | 1/1992 |
| EP | 2535401 | A1 | 12/2012 |

(Continued)

OTHER PUBLICATIONS

BIO-Soft® S-101, Gas Registry No. 68584-22-5; Stepan Company. Northfield, IL, Oct. 2017 Supersedes; Jan. 2012.

(Continued)

*Primary Examiner* — Nicole M. Buie-Hatcher
*Assistant Examiner* — M. Reza Asdjodi
(74) *Attorney, Agent, or Firm* — CANTOR COLBURN LLP

(57) ABSTRACT

A unit dose detergent product includes a unit dose pouch with a water soluble film, and a liquid detergent encapsulated in the unit dose pouch. The liquid detergent includes a soil release polymer, at least 10% by weight of an alkyl-ether sulfate, an alkoxylated polyamine, less than 30% by weight of water, and, optionally, a polyglycol. A mixture of 2 parts of the liquid detergent composition to 1 part water has a viscosity below 3,000 centipoise.

18 Claims, 2 Drawing Sheets

(51) Int. Cl.

| | |
|---|---|
| ***C11D 1/72*** | (2006.01) |
| ***C11D 3/20*** | (2006.01) |
| ***C11D 11/00*** | (2006.01) |
| ***C11D 17/04*** | (2006.01) |

(52) U.S. Cl.

CPC .......... *C11D 3/2065* (2013.01); *C11D 3/3707* (2013.01); *C11D 3/3723* (2013.01); *C11D 17/043* (2013.01); *C11D 2111/12* (2024.01)

(56) References Cited

U.S. PATENT DOCUMENTS 4,702,857 A 10/1987 Gosselink
4,744,916 A 5/1988 Adams et al.
6,083,897 A 7/2000 Lewis et al.
6,482,792 B2 11/2002 Ip
6,566,317 B2 5/2003 Morris et al.
8,598,105 B2 * 12/2013 Miyake ................ C11D 3/3707 510/505
9,487,739 B2 * 11/2016 Loughnane .......... C11D 3/3723
2004/0077519 A1 4/2004 Price et al.
2006/0094617 A1 5/2006 Price et al.
2007/0275868 A1 11/2007 Cooremans et al.
2009/0124528 A1 5/2009 Danziger et al.
2011/0237486 A1 9/2011 Souter et al.
2011/0312869 A1 12/2011 Danziger et al.
2011/0319311 A1 12/2011 Labeque et al.
2012/0175797 A1 7/2012 Labeque et al.
2013/0123162 A1 5/2013 Souter et al.
2014/0073551 A1 3/2014 Mort, III et al.
2015/0275144 A1 * 10/2015 Hulskotter ............. C11D 1/721 510/360
2016/0075975 A1 * 3/2016 Loughnane .............. C11D 1/00 510/320
2016/0090551 A1 * 3/2016 Fossum ................ C11D 3/3707 510/327
2016/0090552 A1 * 3/2016 Loughnane .......... C11D 3/3707 510/300
2016/0090562 A1 3/2016 Loughnane et al.
2016/0090564 A1 * 3/2016 Loughnane .............. C11D 1/88 510/320
2016/0097022 A1 4/2016 Mikkelsen
2017/0029747 A1 2/2017 Depoot et al.
2017/0121642 A1 * 5/2017 Loughnane .......... C11D 3/3723
2017/0183609 A1 6/2017 Hulskotter et al.
2017/0191005 A1 7/2017 Foverskov et al.
2017/0283748 A1 10/2017 Caires
2017/0321152 A1 11/2017 Meine et al.
2018/0216037 A1 8/2018 Hamersky et al.
2018/0216038 A1 8/2018 Mort, III et al.
2018/0216050 A1 8/2018 Denome et al.
2018/0216052 A1 8/2018 Denome et al.
2018/0312778 A1 11/2018 Campbell et al.
2018/0334641 A1 11/2018 Piorkowski
2019/0112556 A1 * 4/2019 Miracle ............... C09B 67/0041
2019/0161705 A1 5/2019 Delplancke et al.
2019/0169118 A1 6/2019 Piorkowski et al.
2019/0225914 A1 7/2019 Stenger et al.
2019/0233768 A1 8/2019 Piorkowski et al.
2019/0233784 A1 8/2019 Sivik et al.
2019/0263575 A1 * 8/2019 Jagannath .............. B65D 65/46
2019/0264139 A1 8/2019 Lant et al.
2019/0284508 A1 9/2019 Gonzales et al.
2019/0330565 A1 10/2019 Mutch et al.
2020/0032179 A1 * 1/2020 Sivik ...................... C11D 3/046
2020/0063069 A1 * 2/2020 Randall .................... C11D 1/83
2020/0123468 A1 4/2020 Tajmamet et al.
2022/0186144 A1 * 6/2022 Coletta ................ C11D 3/3715

FOREIGN PATENT DOCUMENTS

GB 2209342 A 5/1989
WO 2012104159 A1 8/2012
WO 2012156250 A1 11/2012
WO 2016032994 A1 3/2016
WO 2016075178 A1 5/2016
WO 2017040558 A1 3/2017
WO 2017156141 A1 9/2017
WO 2018028935 A1 2/2018
WO 2018028936 A1 2/2018
WO WO-2018124989 A1 * 7/2018 ............. A63C 17/01

OTHER PUBLICATIONS

PCT International Search Report, PCT/US2019/067997, Completed: Apr. 23, 2020, Date of Mailing: Apr. 24, 2020, 10 Pages.
PCT International Search Report, PCT/US2019/068027, Completed: Apr. 23, 2020; Mailing Date: Apr. 24, 2020, 9 pages.
PCT International Search Report and Written Opinion, PCT/US2021/063604, Completed: Aug. 30, 2022; Mailing Date: Aug. 31, 2022.

* cited by examiner

| | As-Is Rheology (No dilution) | | | | | | | | |
|---|---|---|---|---|---|---|---|---|---|
| Formula | Z | 2-A | 2-B | 2-C | 2-D | 3-A | 3-B | 3-C | 3-D |
| Viscosity (Pa.s) | 0.14 | 0.16 | 0.16 | 0.13 | 0.17 | 0.15 | 0.15 | 0.13 | 0.13 |

| | 2 to 1 Dilution (2 parts formula to 1 part water) | | | | | | | | |
|---|---|---|---|---|---|---|---|---|---|
| Formula | Z | 2-A | 2-B | 2-C | 2-D | 3-A | 3-B | 3-C | 3-D |
| Viscosity (Pa.s) | 109.76 | 2.72 | 0.91 | 0.47 | 0.38 | 0.39 | 0.331 | 0.27 | 0.35 |

FIG. 1

UNIT DOSE LAUNDRY DETERGENT COMPOSITIONS CONTAINING SOIL RELEASE POLYMERS

FIELD OF THE INVENTION

This disclosure relates to unit dose detergent compositions. Specifically, the disclosure relates to inclusion of soil release polymers in unit dose detergent compositions that contain alcohol ethoxysulfate (AES) surfactant.

BACKGROUND OF THE INVENTION

During the laundry washing cycle, soil release polymers (SRP) can deposit onto fabric to form a protective barrier against stains. These polymers are typically most effective with polyester fabrics but can also be used with cotton or cotton/polyester blends.

However, depending on how a laundry detergent composition is formulated and wash conditions, SRP may not be effectively deposited onto fabric to form a protective barrier. Conventionally, it may take several washes (for example, up to 10 washes) for the protective barrier to form and become efficacious. Prior to the formation of this barrier, the consumer will see minimal to no benefits. Without the protective barrier, a stain is adhered directly to the textile fabric, resulting in a more difficult stain to clean. In contrast, after an efficacious protective barrier is formed by SRP and the textile is stained (especially with oily soil stains such as beef drippings, sebum, oily makeup, butter), cleaning surfactants can more readily remove the stain by dislodging the SRP protective barrier that the stain is adhered to. As a result, it is recommended that consumers pre-wash clothes multiple times before use to form the SRP protective barrier prior to wearing a garment.

Forming an SRP barrier on clothes by performing multiple prewashes is a burden to consumers. Being able to form an SRP barrier on the go, i.e., through normal washes instead of pre-washes, as well as a reduction of the number of washes it takes to form the SRP barrier, is a long-felt industry need. Any reduction in the number of washes to form an efficacious SRP barrier would improve the consumer experience with this class of polymers. Moreover, reducing or removing a need for pre-washing clothing to obtain the benefits of an SRP would also be an environmental benefit.

To form a protective barrier onto fabric, it is desirable that the SRP in a laundry detergent composition is readily available to interact with fabric during wash, preferably throughout an entire wash cycle. To achieve this goal, SRP is conventionally incorporated in a traditional liquid dose formulation where it is easily added to the other base components of the detergent composition. In contrast, formulating a unit dose laundry detergent composition containing SRP presents unique technical challenges because detergent ingredients are encapsulated in a polyvinyl alcohol film pouch. Dissolution of the polyvinyl alcohol film creates a barrier for any SRP to be accessible to fabric. Additionally, certain surfactants utilized in unit dose detergent products are known to experience dynamic rheology changes during the dilution process in wash water, which further limit SRP's exposure and interaction with fabric during the wash cycle.

For instance, unit dose liquid detergent formulations with at least 10 percent active alcohol ethoxysulfate surfactant (AES) are known to significantly increase their viscosity upon dilution with water. An exemplary formulation can see a starting viscosity around 150 centipoises, but after a 1 to 2 dilution with water, the viscosity can increase to 10,000 centipoises (at 25 degrees Celsius). Upon further dilution with water, the exemplary formulation will thin to less than 10 centipoises. This viscosity effect of AES in a unit dose liquid detergent formulation will be referred to as "dilution rheology."

When dilution rheology is not controlled, the resulting unit dose formulation will have a slower rate of SRP barrier formation versus a controlled formulation. This is due to the liquid formulation going through an increased viscosity phase upon dilution as the polyvinyl alcohol film dissolves and exposes the liquid to wash water.

Versus traditional liquid laundry compositions (i.e., liquid laundry detergent in a plastic bottle), the dilution effect is more extreme because the polyvinyl alcohol film needs to substantially dissolve first, so the liquid detergent can become exposed to water and become diluted. Traditional liquid detergents are dispensed directly into the wash water and can be mixed more easily therein without a film barrier separating or slowing the detergent liquid from access to the wash water (i.e., the film reduces the amount of surface area of the detergent exposed to water).

In unit dose liquid detergents, the inclusion of polyethylene glycol 400, polyethyleneimine ethoxylate and combinations thereof have been shown to significantly reduce or eliminate an increase in viscosity upon dilution with water. This enables the unit dose detergent to readily dilute and more easily release from the encapsulating polyvinyl alcohol film. This quicker release enables an increase in the exposure time of fabrics to the SRP during the washing cycle, enabling a greater deposition of the SRP and, potentially a reduction in the number of washes needed to form an efficacious barrier.

Consequently, there is a long-felt need in the industry to improve unit dose liquid detergent formulations containing SRP so that the SRP's benefits can be fully realized on fabric in a minimal number of washes.

Applicant of the present application is the same applicant as for co-pending applications concerning rheology-controlled formulations including PEG 400, polyethyleneimine ethoxylates, and tri-block polymers (EO/PO/EO and PO/EO/PO). However, no prior efforts were discussed regarding benefits of PEG, polyethyleneimine ethoxylates, tri-block polymers (EO/PO/EO and PO/EO/PO) for soil release polymer deposition. It was surprisingly found that such platforms can be utilized to increase efficacy and decrease pre-efficacy washing of SRPs.

SUMMARY OF THE INVENTION

Unit dose detergent products including a unit dose pouch comprising a water soluble film and a liquid detergent encapsulated in the unit dose pouch are provided, preferably for use in laundering garments and fabrics. The liquid detergent includes a soil release polymer, at least 10% by weight of active alcohol ethoxysulfate (AES) surfactant, a polyglycol, an alkoxylated polyamine, and less than 30% by weight of water. A mixture of 2 parts of the liquid detergent composition to 1 part water has a viscosity below 3,000 centipoise, preferably below 1,000 centipoise, more preferably below 500 centipoise.

In one embodiment, the alkoxylated polyamine may be an ethoxylated polyethyleneimine, preferably polyethyleneimine ethoxylated polymer. The alkoxylated polyamine may be present in an amount from about 0.5 to about 5% by weight of the liquid detergent composition, more preferably about 0.8 to about 4%, most preferably about 0.8 to about 3.2% by weight.

In some embodiments, the liquid detergent further comprises polyethylene glycol (PEG) polymer having a weight average molecular weight of from about 200 to about 1,000 Daltons, preferably about 300 to about 800 Daltons, more preferably about 300 to about 600 Daltons, most preferably about 400 Daltons, i.e., PEG 400.

In certain embodiments, the PEG is present in an amount of about 1 to about 20% by weight of the detergent composition, more preferably about 2 to about 8%, most preferably about 2 to about 5% by weight of the detergent composition.

In some embodiments, a weight ratio of the PEG to the polyethyleneimine ethoxylated polymer is from about 10:1 to about 1:10, preferably from about 8:1 to about 1:8, more preferably about 5:1 to about 1:5.

In certain embodiments, the non-aqueous solvent combination of the PEG and PEI-EO polymers is present in an amount of from about 2 to about 13 weight percent, more preferably about 3 to about 9 weight percent, based on the total weight of the detergent composition.

In an embodiment, the soil release polymer is polyester-based and includes polymers of aromatic dicarboxylic acids and alkylene glycols. In one preferred embodiment, the soil release polymer is a polyester, preferably the soil release polymer is a nonionic water-soluble polyester. In certain embodiments, the soil release polymer is a polyester having repeat units formed from alkylene terephthalate units, containing 10%-30% by weight of alkylene terephthalate units together with 90%-70% by weight of polyoxyethylene terephthalate units which derive from a polyoxyethylene glycol having a mean molecular weight of 300-8000.

In some embodiments, the soil release polymer is present in an amount from about 0.25 to about 3.5% by weight of the liquid detergent composition, preferably about 0.5 wt. % to about 3 wt. %, more preferably about 1 to about 2 wt. %.

In certain embodiments, water is present in the detergent composition in an amount of from about 8 to about 30 weight percent, more preferably 10 to about 25 weight percent, based on the total weight of the detergent composition.

In an embodiment, the liquid detergent composition further includes about 10 to about 30% by weight, or about 10 to about 25% by weight, of a C2 to C5 polyol and about 2 to about 5% by weight of a C2 to C5 alkanolamine. The C2 to C5 polyol may be a mixture of glycerin and propylene glycol, and a ratio of glycerin to propylene glycol in the unit dose detergent compositions may be within 2:1 to 1:2. Glycerin may be present in an amount from about 5 to about 15% by weight, more preferably about 8 to about 13% by weight of the liquid detergent composition.

In some embodiments, the liquid detergent composition further includes a linear alkylbenzene sulfonate and a fatty alcohol ethoxylate. The alkyl-ether sulfate, the linear alkyl benzene sulfonate, and the fatty alcohol ethoxylate may be present in a weight ratio of about (2 to 5):1:(3 to 10) in the composition.

This specification also describes a liquid detergent composition including a soil release polymer, at least 10% by weight of an alkyl-ether sulfate (AES) surfactant, a polyglycol in an amount of about to about 1 to about 20% by weight of the liquid detergent composition, an alkoxylated polyamine, and less than 30% by weight of water, wherein a weight ratio of the polyglycol to the alkoxylated polyamine is from about 10:1 to about 1:10, and wherein a mixture of 2 parts of the liquid detergent composition to 1 part water has a viscosity below 3,000 centipoise, preferably below 1,000 centipoise, more preferably below 500 centipoise.

The detergent composition may be used in a unit dose pack detergent product.

In preferred embodiments, the soil release polymer is present in an amount from about 0.25 to about 3.5% by weight of the liquid detergent composition, preferably about 0.5 wt. % to about 3 wt. %, more preferably about 1 to about 2 wt. %.

In certain preferred embodiments, the polyglycol is about 2 to about 5% by weight of the liquid detergent composition.

In some embodiments, the liquid detergent composition comprises about 0.25 to about 3% by weight of a polyester type soil release polymer comprising aromatic dicarboxylic acids and alkylene glycols. In certain of those embodiments the SRP has (a) one or more nonionic hydrophilic components consisting essentially of (i) polyoxyethylene segments having a polymerization level of at least 2 or (ii) oxypropylene or polyoxypropylene segments having a polymerization level of 2 to 10, where the hydrophilic segment does not include any oxypropylene units, except when they are bonded via ether bonds to adjacent moieties at each end, or (iii) a mixture of oxyalkylene units comprising oxyethylene units and 1 to about 30 oxypropylene units. In certain of those embodiments, the polyoxyethylene segments of (a)(i) have a polymerization level of about 1 to about 200. In other embodiments, the SRP has (b) one or more hydrophobic components comprising (i) C3-oxyalkylene terephthalate segments where, when hydrophobic components also include oxyethylene terephthalate, a ratio of oxyethylene terephthalate to C3-oxyalkylene terephthalate units is about 2:1 or less, (ii) C4-C6-alkylene or oxy-C4-C6-alkylene segments or mixtures thereof, (iii) poly(vinyl ester) segments, or (iv) C1-C4-alkyl ether or C4-hydroxyalkyl ether substituents or mixtures thereof, where the substituents are C1-C4-alkyl ether or C4-hydroxyalkyl ether cellulose derivatives or mixtures thereof and the cellulose derivatives are amphiphilic. In certain embodiments, the SRP is a combination of (a) and (b) type polymers. In some preferred embodiments, the SRP is bio-based, e.g., derived from a plant or other biological material.

In certain particularly preferred embodiments, the soil release polymer is a nonionic water soluble polyester or a polyester having repeat units formed from alkylene terephthalate units, containing 10%-30% by weight of alkylene terephthalate units together with 90%-70% by weight of polyoxyethylene terephthalate units which derive from a polyoxyethylene glycol having a mean molecular weight of 300-8000.

The polyglycol may be a polyethylene glycol and may be present in an amount from about 2 to about 5% by weight of the liquid detergent composition. The alkoxylated polyamine may be an ethoxylated polyethyleneimine (PEI-EO) and may be present in an amount from about 0.5 to about 5% by weight of the liquid detergent composition, more preferably about 0.8 to about 3.2% by weight.

The polyglycol may have a molecular weight from about 200 to about 1,000 Daltons.

The polyglycol is preferably a PEG polymer and has a weight average molecular weight of from about 300 Daltons to about 800 Daltons, more preferably from about 300 Daltons to about 600 Daltons, most preferably about 400 Daltons, i.e., PEG 400.

In certain embodiments, a ratio of the polyglycol to the PEI-EO polymer is from about 8:1 to about 1:8, more preferably a ratio of the PEG polymer to the PEI-EO polymer is from about 5:1 to about 1:5.

In some embodiments, the non-aqueous solvent combination of the PEG and PEI-EO polymers is present in an amount of from about 2 to about 13 weight percent, based on the total weight of the detergent composition, more preferably about 3 to about 9 weight percent, based on total weight of the detergent composition.

In certain embodiments, water is present in an amount of from about 8 to about 30 weight percent, more preferably from about 10 to about 25 weight percent, based on the total weight of the detergent composition.

In an embodiment, the liquid detergent composition further includes at least one of: a C2 to C5 polyol, a C2 to C5 alkanolamine, an active enzyme, a whitening agent, a bittering agent, a linear alkylbenzene sulfonate, and a fatty alcohol ethoxylate.

This specification further describes a method for reducing the number of washes needed to form a soil release polymer barrier on a fabric by a unit dose detergent composition. The method includes the steps of providing a liquid detergent composition, encapsulating the liquid detergent composition in a pouch made of a water soluble film, and washing the fabric with the encapsulated liquid detergent composition. The liquid detergent composition includes a soil release polymer, at least 10% by weight of an alkyl-ether sulfate, an alkoxylated polyamine, and less than 30% by weight of water. In accordance with the inventive method, the time to form the soil release polymer barrier on the fabric is reduced compared to a liquid detergent composition including the soil release polymer, at least 10% by weight of the alkyl-ether sulfate, and being free of the alkoxylated polyamine.

In certain preferred embodiments, the liquid detergent composition further comprises polyethylene glycol (e.g., PEG 400) present in an amount from about 2 to about 5% by weight of the liquid detergent composition The alkoxylated polyamine may be an ethoxylated polyethyleneimine present in an amount from about 0.5 to about 5% by weight of the liquid detergent composition, more preferably about 0.8 to about 3.2% by weight.

The soil release polymer is preferably a polyester, more preferably a nonionic water-soluble polyester. In certain embodiments, the liquid detergent composition comprises about 0.25 to about 3% by weight of a polyester type soil release polymer comprising aromatic dicarboxylic acids and alkylene glycols. In certain of those embodiments the SRP has (a) one or more nonionic hydrophilic components consisting essentially of (i) polyoxyethylene segments having a polymerization level of at least 2 or (ii) oxypropylene or polyoxypropylene segments having a polymerization level of 2 to 10, where the hydrophilic segment does not include any oxypropylene units, except when they are bonded via ether bonds to adjacent moieties at each end, or (iii) a mixture of oxyalkylene units comprising oxyethylene units and 1 to about 30 oxypropylene units. In certain of those embodiments, the polyoxyethylene segments of (a)(i) have a polymerization level of about 1 to about 200. In other embodiments, the SRP has (b) one or more hydrophobic components comprising (i) C3-oxyalkylene terephthalate segments where, when hydrophobic components also include oxyethylene terephthalate, a ratio of oxyethylene terephthalate to C3-oxyalkylene terephthalate units is about 2:1 or less, (ii) C4-C6-alkylene or oxy-C4-C6-alkylene segments or mixtures thereof, (iii) poly(vinyl ester) segments, or (iv) C1-C4-alkyl ether or C4-hydroxyalkyl ether substituents or mixtures thereof, where the substituents are C1-C4-alkyl ether or C4-hydroxyalkyl ether cellulose derivatives or mixtures thereof and the cellulose derivatives are amphiphilic. In certain embodiments, the SRP is a combination of (a) and (b) type polymers. In certain preferred embodiments, the SRP is or comprises a polyester having repeat units formed from alkylene terephthalate units, containing 10%-30% by weight of alkylene terephthalate units together with 90%-70% by weight of polyoxyethylene terephthalate units which derive from a polyoxyethylene glycol having a mean molecular weight of 300-8000. In some preferred embodiments, the SRP is bio-based, e.g., derived from a plant or other biological material.

In some embodiments, a mixture of 2 parts of the liquid detergent composition to 1 part water has a viscosity below 3,000 centipoise, preferably below 1,000 centipoise, more preferably below 500 centipoise.

The invention also provides a method for cleaning textiles comprising contacting textiles with a washing liquor containing the unit dose detergent compositions disclosed herein in at least one step of a washing process. The cleaning can occur when the washing liquor is about 80° F. or less than 80° F. Advantageously, the cleaning can occur in cold water when the washing liquor is less than 60° F. The method effectively removes yellow-underarm stains, other common stains, as well as has odor removal abilities.

A method for preventing release of dirt during washing of textiles is also provided comprising contacting textiles with a washing liquor containing the unit dose detergent compositions disclosed herein in at least one step of a washing process. The method can occur when the washing liquor is about 80° F. or less than 80° F. Advantageously, the cleaning can occur in cold water when the washing liquor is less than 60° F.

In a further aspect, the present disclosure provides an efficacious method of cleaning a laundry machine by laundering textiles in the machine with a unit dose composition described herein.

BRIEF DESCRIPTION OF THE DRAWINGS

The accompanying drawings illustrate various examples of the principles described herein and are a part of the specification. The illustrated examples do not limit the scope of the claims.

FIG. 1 shows viscosity measurements of exemplary inventive formulations together with a comparative formulation without rheology modifiers.

DETAILED DESCRIPTION OF THE INVENTION

Figure 2:
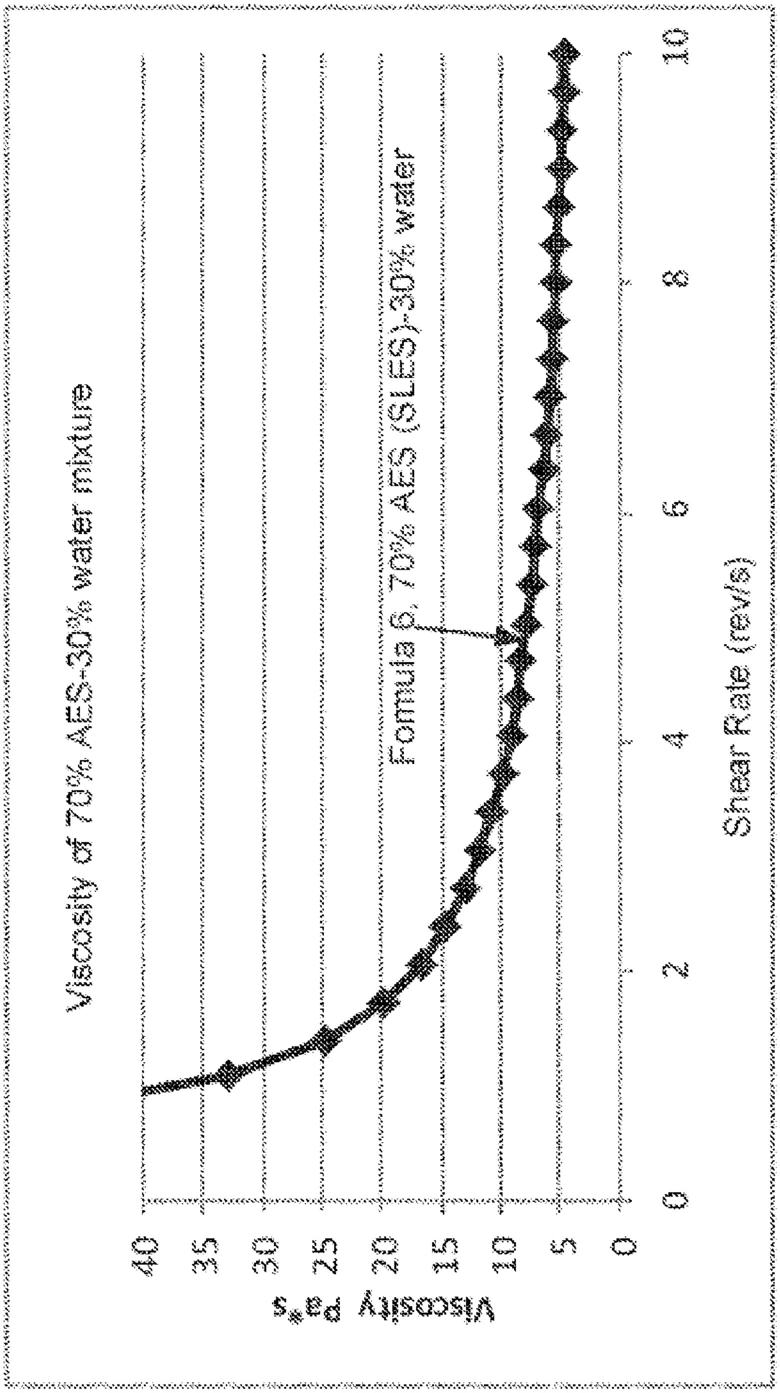
FIG. 2 shows a viscosity curve for a 70:30 mixture of an alkyl-ether sulfate:water.

The following description provides specific details, such as materials and amounts, to provide a thorough understanding of the present invention. The skilled artisan, however, will appreciate that the present invention can be practiced without employing these specific details. Indeed, the present invention can be practiced in conjunction with processing, manufacturing or fabricating techniques conventionally used in the detergent composition industry.

Absent explicit statement to the contrary, reference to wt. %, or wt %, or percent by weight, in the specification refers to the weight percentage of an ingredient as compared to the total weight of the detergent composition. Accordingly, the calculation of wt. % for a detergent composition or an ingredient thereof does not include, for example, the weight of the film. For example, the wt. % of sodium lauryl ether sulfate (SLES) refers to the weight percentage of the active SLES in the composition. The wt. % of the total water in the liquid composition is calculated based on all the water including those added as a part of individual ingredients. When an ingredient added to make the liquid composition is not 100% pure and used as a mixture, e.g., in a form of a solution, the wt. % of that material added refers to the weight percentage of the mixture. Thus, a component which is 5 wt. % of the formulation, may be added as 5 wt. % of a pure component or 10 wt. % of solution that is 50% component and 50% water. Either result produces the recited 5 wt. % amount of the component in the resulting formulation. All percentages presented in this specification and the associated claims are weight percentages unless explicitly identified otherwise. Mole fractions and volume fractions are not used unless explicitly identified.

As used in this specification and the associated claims, organic molecules may be represented using the notation of the letter C followed by a number, e.g., C12. The number indicates the number of carbon atoms in the associated organic molecule. The identified organic molecules need not be hydrocarbons but may include substitutions, for example, C3 polyols would include both glycerin and propylene glycol, both of which have three carbons in their structure and multiple hydroxyl substitutions.

The invention provides detergent compositions comprising soil release polymers and at least 10% by weight alcohol ethoxy sulfate (AES) surfactant.

The detergent composition described exists as a liquid in a unit-dose packet. The detergent composition is formulated to be shelf stable, for example, not to undergo unexpected and/or determination changes during shipping, storage, etc. prior to use. In some embodiments, the detergent composition is substantially free of solids. The detergent composition may be substantially free of precipitates. The detergent composition may remain free of precipitates and/or other solids during storage and/or environmental testing conditions to simulate storage.

The detergent composition disperses into the wash liquid. The dilution from the detergent composition to the concentration in the wash liquid may be substantial, for example, over multiple orders of magnitude. A variety of factors encourage the use of smaller unit dose detergent composition packages, including storage size, cost of the film used to contain the unit dose, etc. Generally speaking, consumers may prefer smaller detergent composition dose formulations as convenient and storable. Because the goal is to deliver the same amount of detergent compositions and other active components, many unit dose detergent compositions include lower concentrations of solvents, such as water, compared to traditional liquid detergents. Unit dose detergent compositions may also use other solvents and/or mixtures of solvents or rheology modifiers to increase the storage stability of the water soluble film in contact with the detergent composition.

Accordingly, the detergent composition is stable in its concentrated composition and at its dilute composition. Studies of different mixture ratios of detergent composition to water have found a 2:1 ratio provides relevant modeling of its dissolution-viscosity behavior, which may be measured by large increases in viscosity.

In addition to the aforementioned, the unit dose detergent compositions may include a variety of additional components including but not limited to: surfactants (anionic, cationic, non-ionic, zwitterionic and/or amphoteric), rheology control agents, humectants, non-aqueous solvents, water, builders, complexers, chelators, enzymes, foam stabilizers, colorants, colorant stabilizers, optical brighteners, whitening agents, bittering agents, perfumes, and other optional component.

Soil Release Polymers

Suitable soil release polymers may include those disclosed in U.S. Publication No. 20190330565, the entirety of which is incorporated by reference.

Suitable soil release polymers include polyester-based soil release polymers, which generally comprise polymers of aromatic dicarboxylic acids and alkylene glycols (including polymers that additionally contain polyalkylene glycols). The polymeric soil release agents usable here especially include those soil release agents having (a) one or more nonionic hydrophilic components consisting essentially of (i) polyoxyethylene segments having a polymerization level of at least 2 or (ii) oxypropylene or polyoxypropylene segments having a polymerization level of 2 to 10, where the hydrophilic segment does not include any oxypropylene units, except when they are bonded via ether bonds to adjacent moieties at each end, or (iii) a mixture of oxyalkylene units comprising oxyethylene units and 1 to about 30 oxypropylene units, where the mixture contains a sufficiently great amount of oxyethylene units for the hydrophilic component to be hydrophilic enough to increase the hydrophilicity of conventional synthetic polyester fiber surfaces on deposition of the soil release agent on such a surface, where the hydrophilic segments contain preferably at least 25% oxyethylene units and more preferably, especially for those components having about 20 to 30 oxypropylene units, at least about 50% oxyethylene units;

or (b) one or more hydrophobic components comprising: (i) C3-oxyalkylene terephthalate segments where, when the hydrophobic components also include oxyethylene terephthalate, the ratio of oxyethylene terephthalate to C3-oxyalkylene terephthalate units is about 2:1 or less, (ii) C4-C6-alkylene or oxy-C4-C6-alkylene segments or mixtures thereof, (iii) poly(vinyl ester) segments, preferably polyvinyl acetate, with a polymerization level of at least 2 or (iv) C1-C4-alkyl ether or C4-hydroxyalkyl ether substituents or mixtures thereof, where the substituents are in the form of C1-C4-alkyl ether or C4-hydroxyalkyl ether cellulose derivatives or mixtures thereof and cellulose derivatives of this kind are amphiphilic, where they have a sufficient content of C1-C4-alkyl ether and/or C4-hydroxyalkyl ether units to be deposited on conventional synthetic polyester fiber surfaces and, after adhering on a conventional synthetic fiber surface of this kind, retain a sufficient content of hydroxyl groups to increase the hydrophilicity of the fiber surface, or a combination of (a) and (b).

Typically, the polyoxyethylene segments of (a) (i) have a polymerization level of about 1 to about 200, although it is also possible to use higher levels, preferably of 3 to about 150 and more preferably of 6 to about 100.

A preferred polymeric soil release agent is a polyester having repeat units formed from alkylene terephthalate units, containing 10%-30% by weight of alkylene terephthalate units together with 90%-70% by weight of polyoxyethylene terephthalate units which derive from a polyoxyethylene glycol having a mean molecular weight of 300-8000.

In one embodiment, the SRP is a (1) polyester polymer based on terephthalic acid and propylene glycol with a molecular weight of less than 4000 g/mol. In some of those embodiments, the polyester polymers are polyesters based on terephthalic acid and 1,2-propylene glycol endcapped with methoxy PEG 750 and a molecular weight of about 2700 g/mol.

In another embodiment, the SRP is a (2) polyester polymer based on terephthalic acid and propylene glycol with a molecular weight of equal to or more than 4000 g/mol. In some of those embodiments, the polyester polymers are polyesters based on terephthalic acid and 1,2-propylene glycol endcapped with methoxy PEG 2000 and a molecular weight M w of about 6200 g/mol.

In certain embodiments, the SRP is a combination of (1) and (2).

In another embodiment, the SRP is or includes a polyester polymer comprising —OOC-(1,4-phenylene)—COO-structural units and —O—CH2CH2—O— structural units, i.e., comprising only repeating structural units (a1) and no repeating structural units (a2) of the polyesters of component a), as described in WO 201675178 (the contents of which is incorporated herein by reference):

(a1)

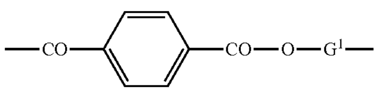

(a2)

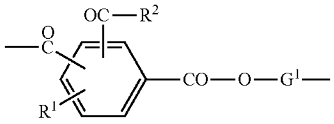

wherein

G is one or more of ($C_nH_2nO$) with n being a number of from 2 to 10, preferably from 2 to 6 and more preferably ($C2H_4O$), (CsHeO), ($C_4H_8O$) or ($C_6H_{12}O$), R is H or $COR^2$, $R^2$ is X—($C3H_6O$)p-(C2H O)q-Y wherein X is NH or O, Y is a C1-30 alkyl, preferably Ci-$_4$ alkyl and more preferably methyl, the (C3H6O)— and ($C2H_4O$)-groups may be arranged blockwise, alternating, periodically and/or statistically, preferably blockwise and/or statistically, and wherein the connections of the groups (C3H6O)— and ($C2H_4O$)— to X— and —Y are free to vary, or O—G—H, preferably X—($C3H_6O$) p-(C2H4O)q-Y!p is based on a molar average, a number of from 0 to 60, preferably from 0 to 30 and more preferably from 0 to 15, q is based on a molar average, a number of from 1 to 300, preferably from 5 to 120 and more preferably from 15 to 50.

In a particularly preferred embodiment, the SRP has the structure of polymer 4 of Table III in U.S. Pat. No. 4,702,857 (the contents of which is incorporated herein by reference), i.e., it is a polyester that has 9 units terephthalate, 2 units 5-sulfoisophthalate, 10 units ethylene glycol, 2 units methyl capped PEG (43 EO).

In some embodiments, the detergent composition contains about 0.25 wt. % to about 3.5 wt. % of soil release polymer(s), preferably about 0.5 wt. % to about 3 wt. %, more preferably about 1 to about 2 wt. %.

Examples of particularly useful soil release polymers are commercially available water-soluble polyester substances which are provided as an aqueous mixture or in a mixture with 10-20% w/w propylene glycol. In particularly preferred embodiments, the SRP is bio-based, e.g., derived from a plant or other biological material.

Surfactant

The detergent compositions include an alkyl ether sulfate also referred to alcohol ethoxy sulfates (AES). The alkyl-ether sulfates will generally be used in the form of mixtures comprising varying R' chain lengths and varying degrees of ethoxylation. The heterogeneity of chain length may be due to the sourcing of the material and/or the processing of the material. Frequently such mixtures will inevitably also contain some unethoxylated alkyl sulfate materials, i.e., surfactants of the above ethoxylated alkyl sulfate formula wherein n=0. Unethoxylated alkyl sulfates may also be added separately to the liquid compositions of this invention. Suitable unalkoxylated, e.g., unethoxylated, alkyl-ether sulfate surfactants are those produced by the sulfation of higher $C_8$-$C_{20}$ fatty alcohols. Conventional primary alkyl sulfate surfactants have the general formula of: $ROSO_3M$, wherein R is typically a linear $C_8$-$C_{20}$ hydrocarbyl group, which may be straight chain or branched chain, and M is a water-solubilizing cation; preferably R is a C10-C15 alkyl, and M is alkali metal. In one embodiment, R is $C_{12}$-$C_{14}$ and M is sodium.

In one embodiment, the AES corresponds to the following formula (III):

$$R'—O—(C_2H_4O)_n—SO_3M' \quad \text{(III)}$$

wherein R' is a $C_8$-$C_{20}$ alkyl group, n is from 1 to 20, and M' is a salt-forming cation; preferably, R' is C10-C18 alkyl, n is from 1 to 15, and M' is sodium, potassium, ammonium, alkylammonium, or alkanolammonium. In an embodiment, R' is a $C_{12}$-$C_{16}$ alkyl, n is from 1 to 6 and M' is sodium. In one preferred embodiment, the alkyl-ether sulfate has a C12 alkyl chain, for example, sodium lauryl ether sulphate (SLES).

In one embodiment, the detergent composition contains at least 10 wt. % AES surfactant, preferably about 15 wt. % to about 40 wt. %, more preferably about 20 wt. % to about 30 wt. %.

Other useful surfactants in the liquid compositions of the present invention include, for example, additional anionic surfactant, a nonionic surfactant, a cationic surfactant, an ampholytic surfactant, a zwitterionic surfactant, and/or mixtures thereof. The use of multiple surfactants of a particular type or a distribution of different weights of a surfactant may be particularly useful. The categories of surfactants will be discussed individually, below.

Anionic Surfactants: suitable anionic surfactants include, but are not limited to, those surfactants that contain a long chain hydrocarbon hydrophobic group in their molecular structure and a hydrophilic group, i.e., water solubilizing group including salts such as carboxylate, sulfonate, sulfate, or phosphate groups. Suitable anionic surfactant salts include sodium, potassium, calcium, magnesium, barium, iron, ammonium and amine salts.

The anionic surfactant may include a water-soluble salt of an alkyl benzene sulfonate having between 8 and 22 carbon atoms in the alkyl group. In one embodiment, the anionic surfactant comprises an alkali metal salt of C10-16 alkyl benzene sulfonic acids, such as $C_{11-14}$ alkyl benzene sulfonic acids. In one embodiment, the alkyl group is linear and such linear alkyl benzene sulfonates are known in the art as "LAS." An exemplary LAS is 2-phenyl sulfonic acid, also referred to as 2-dodecylbenzenesulfonic acid.

In certain embodiments, LAS may be present in the liquid detergent composition at about 3 to about 15 wt. % of the detergent composition, more preferably about 4 to about 12 wt. %, most preferably about 4 to about 8 wt. %. In certain preferred embodiments, LAS, namely 2-dodecylbenzene-sulfonic acid, is present in the detergent composition at about 4 to about 5 wt. %.

Other suitable anionic surfactants include sodium and potassium linear, straight chain alkylbenzene sulfonates in which the average number of carbon atoms in the alkyl group is between 11 and 14. Sodium $C_{11}$-$C_{14}$, e.g., $C_{12}$, LAS are exemplary of suitable anionic surfactants for use herein.

In one embodiment, the anionic surfactant includes at least one α-sulfofatty acid ester. Such a sulfofatty acid is typically formed by esterifying a carboxylic acid with an alkanol and then sulfonating the a-position of the resulting ester. The α-sulfofatty acid ester is typically of the following formula (IV):

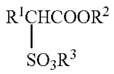

(IV)

wherein $R^1$ is a linear or branched alkyl, $R^2$ is a linear or branched alkyl, and $R^3$ is hydrogen, a halogen, a mono-valent or di-valent cation, or an unsubstituted or substituted ammonium cation. $R^1$ can be a $C_4$ to $C_{24}$ alkyl, including a $C_{10}$, $C_{12}$, $C_{14}$, $C_{16}$ and/or $C_{18}$ alkyl. $R^2$ can be a $C_1$ to $C_8$ alkyl, including a methyl group. $R^3$ is typically a mono-valent or di-valent cation, such as a cation that forms a water soluble salt with the α-sulfofatty acid ester (e.g., an alkali metal salt such as sodium, potassium or lithium). The α-sulfofatty acid ester of formula (II) can be a methyl ester sulfonate, such as a $C_{16}$ methyl ester sulfonate, a $C_{18}$ methyl ester sulfonate, or a mixture thereof. In another embodiment, the α-sulfofatty acid ester of formula (II) can be a methyl ester sulfonate, such as a mixture of $C_{12}$-$C_{18}$ methyl ester sulfonates.

More typically, the α-sulfofatty acid ester is a salt, such as a salt according to the following formula (V):

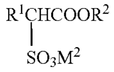

(V)

wherein $R^1$ and $R^2$ are linear or branched alkyls and $M^2$ is a monovalent metal. $R^1$ can be a $C_4$ to $C_{24}$ alkyl, including a $C_{10}$, $C_{12}$, $C_{14}$, $C_{16}$, and/or $C_{18}$ alkyl. $R^2$ can be a $C_1$ to $C_8$ alkyl, including a methyl group. $M^2$ is typically an alkali metal, such as sodium or potassium. The a-sulfofatty acid ester of formula (III) can be a sodium methyl ester sulfonate, such as a sodium $C_8$-$C_{18}$ methyl ester sulfonate.

In one embodiment, the detergent composition contains about 5 wt. % to about 50 wt. % of one or more anionic surfactants, preferably about 15 wt. % to about 40 wt. %, more preferably about 20 wt. % to about 35 wt. %. In certain preferred embodiments, the total amount of anionic surfactants is about 24 wt % to about 31 wt %. In some embodiments, the anionic surfactant is provided in a solvent.

Suitable nonionic surfactants include but not limited to alkoxylated fatty alcohols, ethylene oxide (EO)-propylene oxide (PO) block polymers, and amine oxide surfactants. Suitable for use in the liquid compositions herein are those nonionic surfactants which are normally liquid. Suitable nonionic surfactants for use herein include the alcohol alkoxylated nonionic surfactants. Alcohol alkoxylates are materials which correspond to the general formula of: $R^9(C_mH_{2m}O)_nOH$, wherein $R^9$ is a linear or branched $C_8$-$C_{16}$ alkyl group, m is from 2 to 4, and n ranges from 2 to 12; alternatively, $R^9$ is a linear or branched $C_{9-15}$ or $C_{10-14}$ alkyl group. In another embodiment, the alkoxylated fatty alcohols will be ethoxylated materials that contain from 2 to 12, or 3 to 10, ethylene oxide (EO) moieties per molecule. The alkoxylated fatty alcohol materials useful in the liquid compositions herein will frequently have a hydrophilic-lipophilic balance (HLB) which ranges from 3 to 17, from 6 to 15, or from 8 to 15. Another nonionic surfactant suitable for use includes ethylene oxide (EO)-propylene oxide (PO) block polymers. These materials are formed by adding blocks of ethylene oxide moieties to the ends of polypropylene glycol chains to adjust the surface active properties of the resulting block polymers. In one embodiment, the nonionic surfactant is $C_{12}$-$C_{15}$ alcohol ethoxylate 7EO, that is to say having seven ethylene oxide moieties per molecule. The fatty alcohol ethoxylate may have 3 to 17 moles of ethylene oxide units per mole of fatty alcohol ethoxylate.

Another embodiment of a nonionic surfactant is alkoxylated, preferably ethoxylated or ethoxylated and propoxylated fatty acid alkyl esters, having from 1 to 4 carbon atoms in the alkyl chain, especially fatty acid methyl esters, as described, for example, in JP58/217598, which is incorporated by reference herein. In one embodiment, the nonionic surfactant is methyl ester ethoxylate.

Suitable nonionic surfactants also include polyalkoxylated alkanolamides, which are generally of the following formula (VI):

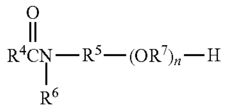

(VI)

wherein $R^4$ is an alkyl or alkoxy, $R^5$ and $R^7$ are alkyls and n is a positive integer. $R^4$ is typically an alkyl containing 6 to 22 carbon atoms. $R^5$ is typically an alkyl containing 1-8 carbon atoms. $R^7$ is typically an alkyl containing 1 to 4 carbon atoms, and more typically an ethyl group. The degree of polyalkoxylation (the molar ratio of the oxyalkyl groups per mole of alkanolamide) typically ranges from about 1 to about 100, or from about 3 to about 8, or about 5 to about 6. $R^6$ can be hydrogen, an alkyl, an alkoxy group or a polyalkoxylated alkyl. The polyalkoxylated alkanolamide is typically a polyalkoxylated mono- or di-alkanolamide, such as a C16 and/or $C_{18}$ ethoxylated monoalkanolamide, or an ethoxylated monoalkanolamide prepared from palm kernel oil or coconut oil. The use of coconut oil, palm oil, and similar naturally occurring oils as precursors may be favored by consumers.

Other suitable nonionic surfactants include those containing an organic hydrophobic group and a hydrophilic group that is a reaction product of a solubilizing group (such as a carboxylate, hydroxyl, amido or amino group) with an alkylating agent, such as ethylene oxide, propylene oxide, or a polyhydration product thereof (such as polyethylene glycol). Such nonionic surfactants include, for example, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, and alkylamine oxides. Other suitable surfactants include those disclosed in U.S. Pat. Nos. 5,945,394 and 6,046,149, the disclosures of which are incorporated herein by reference. In another embodiment, the composition is substantially free of nonylphenol nonionic surfactants. In this context, the term “substantially free” means less than about one weight percent.

Yet another nonionic surfactant useful herein comprises amine oxide surfactants. Amine oxides are often referred to in the art as “semi-polar” nonionics, and have the following formula (VII):

$$R^{10}(EO)_x(PO)_y(BO)_zN(O)(CH_2R^{11})_2 \cdot qH_2O \quad \text{(VII)}$$

wherein $R^{10}$ is a hydrocarbyl moiety which can be saturated or unsaturated, linear or branched, and can typically contain from 8 to 24, from 10 to 16 carbon atoms, ora C12-C16 primary alkyl. $R^{11}$ is a short-chain moiety such as a hydrogen, methyl and —$CH_2OH$. When x+y+z is greater than 0, EO is ethyleneoxy, PO is propyleneoxy and BO is butyleneoxy. In this formula, q is the number of water molecules in the surfactant. In one embodiment, the nonionic surfactant is $C_{2-14}$ alkyldimethyl amine oxide.

In one embodiment, the detergent composition includes about 15 wt. % to about 40 wt. % of one or more nonionic surfactants, preferably about 18 wt. % to about 30 wt. %, more preferably about 20 wt. % to about 25 wt. %.

Zwitterionic and/or Amphoteric Surfactants: Suitable zwitterionic and/or amphoteric surfactants include but not limited to derivatives of secondary and tertiary amines, derivatives of heterocyclic secondary and tertiary amines, or derivatives of quaternary ammonium, quaternary phosphonium or tertiary sulfonium compounds, such as those disclosed in U.S. Pat. No. 3,929,678, which is incorporated by reference herein.

Suitable zwitterionic and/or amphoteric surfactants for uses herein include amido propyl betaines and derivatives of aliphatic or heterocyclic secondary and ternary amines in which the aliphatic moiety can be straight chain or branched and wherein one of the aliphatic substituents contains from 8 to 24 carbon atoms and at least one aliphatic substituent contains an anionic water-solubilizing group. When present, zwitterionic and/or amphoteric surfactants typically constitute from 0.01 wt. % to 20 wt. %, preferably, from 0.5 wt. % to 10 wt. %, and most preferably 2 wt. % to 5 wt. % of the formulation by weight.

Cationic Surfactants: Suitable cationic surfactants include but not limited to quaternary ammonium surfactants. Suitable quaternary ammonium surfactants include mono $C_6$-$C_{16}$, or $C_6$-$C_{10}$ N-alkyl or alkenyl ammonium surfactants, wherein the remaining N positions are substituted by, e.g., methyl, hydroxyethyl or hydroxypropyl groups. Another cationic surfactant is $C_6$-$C_{18}$ alkyl or alkenyl ester of a quaternary ammonium alcohol, such as quaternary chlorine esters. In another embodiment, the cationic surfactants have the following formula (VIII):

(VIII)

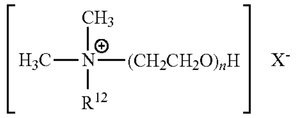

wherein $R^{12}$ is $C_8$-$C_{18}$ hydrocarbyl and mixtures thereof, or $C_{8-14}$ alkyl, or $C_8$, $C_{10}$, or $C_{12}$ alkyl, X is an anion such as chloride or bromide, and n is a positive integer.

The surfactants may be a mixture of at least one anionic and at least one nonionic surfactant. In another embodiment, the anionic surfactant is sodium lauryl ether sulfate. In another embodiment, the surfactant is a mixture of at least two anionic surfactants. In one embodiment, the surfactant comprises a mixture of an alkyl benzene sulfonate and an alkyl-ether sulfate. In another embodiment, and the alkyl-ether sulfate is sodium lauryl ether sulphate (SLES).

In another embodiment, the anionic surfactant is alkyl benzene sulfonic acid, methyl ester sulfate, sodium lauryl ether sulfate, or mixtures thereof. In another embodiment, the nonionic surfactant is alcohol ethoxylate, methyl ester ethoxylate, or mixtures thereof.

In an embodiment, the unit dose detergent composition includes an alkyl-ether sulfate, a linear alkylbenze sulfonate, and a fatty alcohol ethoxylate. These three materials may collectively make up no less than 30% of the formulation.

In certain embodiments, the surfactant comprises about 15 wt. % to about 30 wt. % of an anionic surfactant selected from the group consisting of alkyl benzene sulfonate, methyl ester sulfonate, sodium lauryl ether sulphate, and mixtures thereof, and about 15 wt. % to about 30 wt. % of a nonionic surfactant selected from the group consisting of alcohol ethoxylate, methyl ester ethoxylate, and mixtures thereof. Surfactants may collectively total more than 30 wt. % of the formulation. Surfactants are often the base of detergent compositions, however, other components, such as solvents and humectants may be used to make a liquid formulation rather than a solid formulation.

In an embodiment, fatty alcohol ethoxylate may make up about 15 wt. % to about 40 wt. %, preferably about 18 wt. % to about 30 wt. %, and more preferably about 20 wt. % to about 25 wt. % of the detergent composition. A linear alkyl benzene sulfonate may make up about 1 wt. % to about 12 wt. %, preferably about 2 wt. % to about 8 wt. %, and most preferably, about 4 wt. % to about 6 wt. % of the detergent composition. In some preferred embodiments, the alkyl-ether sulfate, the linear alkyl benzene sulfonate, and the fatty alcohol ethoxylate may be present in a ratio of (2 to 5):1:(3 to 10); preferably in a ratio of (2.5 to 3.5):1:(4 to 6); and most preferably in a ratio of approximately 3:1:5.

Rheology Control Agent

The present invention uses one or more rheology control agents, also referred as a rheology modifying agent, to adjust (e.g., reduce) viscosity during dilution of the unit-dose detergent composition. Applicant's prior disclosures of such agents can be found in U.S. Patent Publication Nos. 20200199491 and 20200199497, and 20210309940, the contents of which are incorporated herein by reference.

A Newtonian fluid is a fluid, where the ratio between shear stress changes linearly in proportion to the stress it is exposed to. This proportion is known as viscosity. Increasing the amount of the rheology controlling agent in the unit dose compositions not only shows a trend of changing the behavior of the fluids (from non-Newtonian to Newtonian) but also gradually lowering the viscosity of the detergent composition, upon dilution with water. Both are advantageous for dissolution of the unit dose detergent production upon exposed to water during use.

Polyglycol polymers may be used as rheology modifying agents. The ability to control the chain length and type of polyglycols used allows tuning of the properties of the resulting polymer. Polyglycols are available in a wide variety of homopolymers and copolymers. As used in this specification and the associated claims, polyglycols refers to unmodified polyglycol polymers. That is to say, the polymer consists of a set of repeat units connected by ether links. The repeat units contain unsubstituted hydrocarbons. In an embodiment, the polyglycol is a polyethylene oxide (PEO) which is also known as polyethylene glycol (PEG). The polyglycol may be a polypropylene glycol (PPG). The polyglycol may be a mixture of either PEG or PPG with at least one other glycol unit. The copolymers may be block copolymers. The copolymers may be random copolymers. The copolymers may be other forms, such as alternating copolymers.

The polyglycol may be present in an amount from about 1 to about 20 wt. %, preferably, from about 1.5 to about 15 wt. %, by weight of the detergent composition, and more preferably, from about 10 to about 13 wt. %.

In an embodiment, the polyglycol may be a polyethylene glycol homopolymer (PEG). The polyglycol may be a polypropylene glycol homopolymer (PPG). The polyglycol may be a copolymer which includes PEG and/or PPG repeat units along with other glycol repeat units. The repeat units may have pendant alkyl substitutions, for example, a methyl group.

In an embodiment, the polyglycol has a molecular weight between 200 and 1200 Daltons, preferably, 300 to 800 Daltons, and most preferably from 300 to 500 Daltons. The polyglycol may be a linear polyglycol. The polyglycol may be a star, comb, and/or network polyglycol.

The use of PEG with a specific number, for example, "PEG 400", indicates PEG having a weight average molecular weight of about the specific number (i.e., 400), for example having weight average MW ranging from about 380 to about 420.

In certain embodiments, The PEG used in accordance with the present disclosure may have a weight average MW from about 200 Daltons to about 1000 Daltons, for example from about 300 Daltons to about 900 Daltons, or about 300 Daltons to about 800 Daltons, or about 300 Daltons to about 600 Daltons. Alternatively, the PEG may have a weight average MW from about 200 Daltons to about 500 Daltons, or from about 300 Daltons to about 600 Daltons. In a particular embodiment, PEG 400 is included.

In preferred embodiments, PEG is included at about 2 to about 20 wt. % of the detergent composition, more preferably about 2 to about 5 wt. % of the detergent composition.

Alkoxylated polyamines may be used as rheology modifying agents. The addition of alkoxy chains to polymers allows modification of hydrophobicity of the resulting polymer. The ability to control the chain length and type of polyglycols used allows tuning of the hydrophilic/lipophilic balance (HLB) of the resulting polymer. Further, the different areas of the polymer, the backbone vs. added chains provide different polarities allowing compatibility with a variety of components in the detergent composition.

Alkoxylated polymers are available with a variety of polymer backbones. In an embodiment, the polymer is formed with a polyamine backbone. In an embodiment, the polyamine is a polyethyleneimine. Preferably, the rheology control agent is an ethoxylated polyethyleneimine.

In certain embodiments, the polyethyleneimine-ethoxylated polymer used in accordance with the present disclosure may include a polyethyleneimine backbone that has a weight average molecular weight of from about 400 Daltons to about 10,000 Daltons, for example from about 400 Daltons to about 6,000 Daltons, such as from about 400 Daltons to about 1,800 Daltons. The substitution of the polyethyleneimine backbone may include one or two ethoxylation modifications per nitrogen atom, dependent on whether the modification occurs at an internal nitrogen atom or at a terminal nitrogen atom in the polyethyleneimine backbone. The ethoxylation modification may consists of the replacement of a hydrogen atom by a polyoxyethylene chain having an average of about 40 to about 90 ethoxy units per modification, for example about 45 to about 80 ethoxy units, such as about 50 to about 80 ethoxy units.

The alkoxylated polymer may have between 10 and 25 polyglycol repeat units per mer unit of the polymer. In an embodiment, the alkoxylated polyethyleneimine rheology control agent is about 0.5 to about 10 wt. % of the formulation by weight, preferably, about 0.5 to about 5 wt. % of the formulation by weight, more preferably about 0.8 to about 3.2 wt. % of the formulation.

In certain embodiments, a combination of (1) polyethylene glycol (PEG) polymer having a molecular weight (MW) in a range from about 200 to about 1000 Daltons and (2) polyethyleneimine-ethoxylated polymer can allow for the incorporation of less total non-aqueous solvent to achieve a suitable viscosity when diluted in water than if either solvent had been used individually. The non-aqueous solvent combination of the PEG and PEI-EO polymers is present in an amount of from about 1 to about 30 weight percent, based on the total weight of the wash composition. Furthermore, a weight ratio of the PEG polymer to the PEI-EO polymer can range from about 10:1 to about 1:10, for example from about 8:1 to about 1:8, or about 5:1 to about 1:5, or about 3:1 to about 1:3, or about 2:1 to about 1:2, or about 1:1. In other embodiments, this weight ratio may be from about 10:1 to about 1:5, from about 5:1 to about 1:2, from about 1:2 to about 5:1, or from about 1:2 to about 10:1. The effectiveness of these concentrations can be seen in the viscosity data shown in FIG. 1, especially, in Formula 3-C (5 wt. % of PEG and 4 wt. % of PEI-EO) and Formula 3-D (5 wt. % of PEG and 1 wt. % of PEI-EO).

The non-aqueous solvent combination of the PEG polymer and the polyethyleneimine-ethoxylated polymer in accordance with any of the foregoing embodiments may be included in the detergent composition at amounts of from about 1 to about 30 weight percent, or from about 2 to about 20 weight percent, or from about 2.5 to about 10 weight percent, or from about 6 to about 9 weight percent, in various embodiments, based on the total weight of the detergent composition.

Other Ingredients

The unit dose detergent compositions of the present invention may optionally comprise other ingredients that can typically be present in detergent products and/or personal care products to provide further benefits in terms of cleaning power, solubilization, appearance, fragrance, etc. Different groups of such materials are described below.

Besides the non-aqueous solvent combination of the PEG and PEI-EO polymers described above, the detergent composition may optionally include other non-aqueous solvents.

For example, other non-aqueous solvents that may be included in the detergent composition are glycerol, propylene glycol, ethylene glycol, ethanol, and 4C+ compounds. The term “4C+ compound” refers to one or more of: polypropylene glycol; polyethylene glycol esters such as polyethylene glycol stearate, propylene glycol laurate, and/or propylene glycol palmitate; methyl ester ethoxylate; diethylene glycol; dipropylene glycol; sorbitol; tetramethylene glycol; butylene glycol; pentanediol; hexylene glycol; heptylene glycol; octylene glycol; 2-methyl, 1,3 propanediol; xylitol; mannitol; erythritol; dulcitol; inositol; adonitol; triethylene glycol; polypropylene glycol; glycol ethers, such as ethylene glycol monobutyl ether, diethylene glycol monobutyl ether, triethylene glycol monobutyl ether, ethylene glycol monopropyl ether, diethylene glycol monoethyl ether, triethylene glycol monoethyl ether, diethylene glycol monomethyl ether, and triethylene glycol monomethyl ether; tris (2-hydroxyethyl)methyl ammonium methylsulfate; ethylene oxide/propylene oxide copolymers with a number average molecular weight of 3,500 Daltons or less; and ethoxylated fatty acids. These optional non-aqueous solvents may be included in amounts, individually, of anywhere from about 1 weight percent to about 30 weight percent.

Humectants: A humectant, for purposes of the present invention, is a substance that exhibits high affinity for water, especially attracting water for moisturization and solubilization purposes. The water is absorbed into the humectant; not merely adsorbed at a surface layer. The water absorbed by the humectant is available to the system; the water is not too tightly bound to the humectant. For example, in a skin lotion, the humectant attracts moisture from the surrounding atmosphere while reducing transepidermal water loss, and makes the water available to the skin barrier. Similarly, the humectant in a single dose liquid formula will not trap all the water needed for solubilization of other formula components—it will help to maintain the water balance between the formula, the film, and the atmosphere. Humectants possess hydrophilic groups which form hydrogen bonds with water. Common hydrophilic groups include hydroxyl, carboxyl, ester, and amine functionalities. A humectant can thus act as a solubilizer and moisture regulator in a unit dose formulation. Useful humectants include but not limited to polyols.

The polyol (or polyhydric alcohol) may be a linear or branched alcohol with two or more hydroxyl groups. Thus, diols with two hydroxyl groups attached to separate carbon atoms in an aliphatic chain may also be used. The polyol typically includes less than 9 carbon atoms, such as 9, 8, 7, 6, 5, 4, 3, or 2 carbon atoms. Preferably, the polyol includes 3 to 8 carbon atoms. More preferably, the polyol includes 3 to 6 carbon atoms. The molecular weight is typically less than 500 g/mol, such as less than 400 g/mol or less than 300 g/mol.

Embodiments of suitable polyols include, but not limited to: propylene glycol, butylene glycol, pentylene glycol, hexylene glycol, heptylene glycol, octylene glycol, 2-methyl-1,3-propanediol, xylitol, sorbitol, mannitol, diethylene glycol, triethylene glycol, glycerol, glycerin, erythritol, dulcitol, inositol, and adonitol.

The unit dose detergent compositions of the present invention may contain about 5 wt. % to about 75 wt. % of one or more humectants, preferably about 7 wt. % to about 50 w.t %, more preferably about 10 wt. % to about 40 wt. %. In one preferred embodiment, the liquid composition comprises 10 to 30 wt. % of one or more $C_2$ to $C_5$ polyols. Preferably, the $C_2$ to $C_5$ polyols comprise a mixture of glycerin and propylene glycol, where the ratio of glycerin to propylene glycol is from 2:1 to 1:2. The liquid composition may be substantially free of monoalcohols, for example, the composition may comprise less than 1 wt. % of monoalcohols.

Water: Water functions as a solvent and viscosity modifier. Water may be present as no more than 30 wt. % of the unit dose detergent composition. In certain embodiments, water is present in the detergent composition in an amount of from about 8 to about 30 weight percent, more preferably 10 to about 25 weight percent, based on the total weight of the detergent composition. Water may comprise no more than 25 wt. % of the unit dose detergent composition. Water may comprise no more than 20 wt. % of the unit dose detergent composition.

Builders: Other suitable components include organic or inorganic detergency builders. Examples of water-soluble inorganic builders that can be used, either alone or in combination with themselves or with organic alkaline sequestrant builder salts, are glycine, alkyl and alkenyl succinates, alkali metal carbonates, alkali metal bicarbonates, phosphates, polyphosphates and silicates. Specific examples of such salts are sodium tripolyphosphate, sodium carbonate, potassium carbonate, sodium bicarbonate, potassium bicarbonate, sodium pyrophosphate and potassium pyrophosphate. Examples of organic builder salts that can be used alone, or in combination with each other, or with the preceding inorganic alkaline builder salts, are alkali metal polycarboxylates, water-soluble citrates such as sodium and potassium citrate, sodium and potassium tartrate, sodium and potassium ethylenediaminetetracetate (EDTA), sodium and potassium N(2-hydroxyethyl)-nitrilo triacetates, sodium and potassium N-(2-hydroxyethyl)-nitrilo diacetates, sodium and potassium oxydisuccinates, and sodium and potassium tartrate mono- and di-succinates, such as those described in U.S. Pat. No. 4,663,071, the disclosure of which is incorporated herein by reference.

Complexer/Chelator: Complexer and chelators help washing liquids support higher amounts of soils and/or metal ions. Complexer and/or chelators may functionally overlap with builders as discussed above. These are often poly carboxylic acids and/or salts thereof. Polyamines also may be used in this role. Suitable examples include iminodisuccinic acid, succinic acid, citric acid, ethylenediaminetetraacetic acid, etc. A complexer and/or chelator may make up about 0 to about 5 wt. % of the formulation, preferably about 0.1 to about 3 wt. % of the formulation, and most preferably about 0.5 to about 2 wt. % of the detergent composition.

Enzymes: Suitable enzymes include those known in the art, such as amylolytic, proteolytic, cellulolytic or lipolytic type, and those listed in U.S. Pat. No. 5,958,864, the disclosure of which is incorporated herein by reference. Suitable enzymes include proteases, amylases, lipases and cellulases. Additional enzymes of these classes suitable for use in accordance with the present invention will be well-known to those of ordinary skill in the art and are available from a variety of commercial suppliers. Enzymes may be provided with other components, including stabilizers. In an embodiment, the enzyme material may be approximately 10% by weight of active enzymes. The detergent composition may include about 0.01 to about 1.3 wt. %, preferably, 0.05 to 0.50 wt. %, and most preferably, about 0.08 to about 0.3 wt. % of active enzymes.

Foam Stabilizers: Foam stabilizing agents include, but not limited to, a polyalkoxylated alkanolamide, amide, amine oxide, betaine, sultaine, $C_8$-$C_{15}$ fatty alcohols, and those disclosed in U.S. Pat. No. 5,616,781, the disclosure of which is incorporated by reference herein. Foam stabilizing agents are used, for example, in amounts of about 1 wt. % to about 20 wt. %, and typically about 3. wt. % to about 5 wt. %. The composition can further include an auxiliary foam stabilizing surfactant, such as a fatty acid amide surfactant. Suitable fatty acid amides are $C_8$-$C_{20}$ alkanol amides, monoethanolamides, diethanolamides, and isopropanolamides.

Colorants: In some embodiments, the liquid composition does not contain a colorant. In some embodiments, the liquid composition contains one or more colorants. The colorant(s) can be, for example, polymers. The colorant(s) can be, for example, dyes. The colorant(s) can be, for example, water-soluble polymeric colorants. The colorant(s) can be, for example, water-soluble dyes. The colorant(s) can be, for example, colorants that are well-known in the art or commercially available from dye or chemical manufacturers.

The colorant(s) can be, for example, one or more of Acid Blue 80, Acid Red 52, and Acid Violet 48. When the colorant(s) are selected from the group consisting of Acid Blue 80, Acid Red 52, and Acid Violet 48, the liquid composition, optionally, does not contain a colorant stabilizer. Surprisingly, it has been found that Acid Blue 80, Acid Red 52, and Acid Violet 48, do not display significant discoloration over time, and thus, can be used without (e.g., in the absence of) a colorant stabilizer.

The colorant may provide a secondary indicator of source for a user. The colorant may provide aesthetic or informational value. For example, the color of the detergent composition may be used to indicate a preferred water temperature (e.g., red for hot, blue for cold).

The total amount of the one or more colorant(s) that can be contained in the liquid composition, for example, can range from about 0.00001 wt. % to about 0.099 wt. %. The total amount of colorant(s) in the liquid composition can be, for example, about 0.0001 wt. %, about 0.001 wt. %, about 0.01 wt. %, about 0.05 wt. %, or about 0.08 wt. %.

Colorant Stabilizer(s): In some embodiments, the liquid composition can optionally contain a colorant stabilizer. In some embodiments, the colorant stabilizer can be citric acid. The total amount of the optionally present colorant stabilizer(s) in the liquid composition can range, for example, from about 0.01 wt. % to about 5.0 wt. %. The total amount of the colorant stabilizer(s) in the liquid composition can be, for example, about 0.1 wt. %, about 1 wt. %, about 2 wt. %, about 3 wt. %, or about 4 wt. %.

Optical Brightener/Whitening Agents: Optical brighteners and/or whitening agents help washed material appear white, especially under florescent light. The particular whitening agent is not believed to be impactful to the shelf stability of the formulations. Whitening agents may be complex, polycyclic molecules. Examples of whitening agents include: 4,4'-diamino-2,2'-stilbenedisulfonic acid and 2,5-bis(benzoxazol-2-yl)thiophene. The substitution of similar whitening agents and/or reasonable modifications of their concentration in the formulation should produce similar results. An optical brightener and/or whitening agent may make up about 0 to about 5 wt. % of the formulation, preferably about 0.1 to about 3 wt. % of the formulation, and most preferably about 0.2 to about 2 wt. % of the detergent composition.

Bittering Agent: Bittering agents may optionally be added to hinder accidental ingestion of the composition. Bittering agents are compositions that taste bad, so children and/or others are discouraged from accidental ingestion. Exemplary bittering agents include denatonium benzoate, aloin, and others. Bittering agents may be present in the composition at an amount of from about 0 to about 1 wt. %, preferably from about 0 to about 0.5 wt. %, and most preferably from about 0 to about 0.1 wt. %, based on the total weight of the detergent composition.

Perfumes: The liquid compositions of the invention may optionally include one or more perfumes or fragrances. As used herein, the term "perfume" is used in its ordinary sense to refer to and include any fragrant substance or mixture of substances including natural (obtained by extraction of flowers, herbs, leaves, roots, barks, wood, blossoms or plants), artificial (mixture of natural oils or oil constituents) and synthetically produced odoriferous substances. Typically, perfumes are complex mixtures of blends of various organic compounds such as alcohols, aldehydes, ethers, aromatic compounds and varying amounts of essential oils (e.g., terpenes) such as from 0 wt. % to 80 wt. %, usually from 1 wt. % to 70 wt. %, the essential oils themselves being volatile odoriferous compounds and also serving to dissolve the other components of the perfume. Perfumes can be present from about 0.1 wt. % to about 10 wt. %, and preferably from about 0.5 wt. % to about 5 wt. % of the detergent composition.

Other Optional Ingredients: The liquid compositions may also contain one or more optional ingredients conventionally included in detergent compositions such as a pH buffering agent, a perfume carrier, a fluorescer, a polyelectrolyte, a pearlescer, an anti-shrinking agent, an anti-wrinkle agent, an anti-spotting agent, an anti-corrosion agent, a drape imparting agent, an anti-static agent, an ironing aids crystal growth inhibitor, an anti-oxidant, an anti-reducing agent, a dispersing agent, a fragrance component, a bleaching catalyst, a bleaching agent, a bleach activator, an anticorrosion agent, a deodorizing agent, a color/texture rejuvenating agent, a preservative, and a mixture thereof. Examples and sources of suitable such components are well-known in the art and/or are described herein.

Water-Soluble Pouch

The unit dose detergent compositions of the present invention may be placed a water-soluble pouch. The water soluble pouch is made from a water-soluble material which dissolves, ruptures, disperses, or disintegrates upon contact with water, releasing thereby the liquid composition. In one embodiment, the water soluble pouch is made from a lower molecular weight water-soluble polyvinyl alcohol film-forming resin.

The water soluble pouch may be formed from a water soluble polymer selected from the group consisting of polyvinyl alcohol (PVA), polyvinyl pyrrolidone, polyalkylene oxide, polyacrylamide, poly acrylic acid, cellulose, cellulose ether, cellulose ester, cellulose amide, polyvinyl acetate, polycarboxylic acid and salt, polyaminoacid, polyamide, polyanhydride copolymer of maleic/acrylic acid, polysaccharide, natural gums, polyacrylate, water-soluble acrylate copolymer, methylcellulose, carboxymethylcellulose sodium, dextrin, ethylcellulose, hydroxyethyl cellulose, maltodextrin, polymethacrylate, polyvinyl alcohol copolymer, hydroxypropyl methyl cellulose (HPMC), and mixtures thereof.

Unit dose pouches and methods of manufacture thereof that are suitable for use with the compositions of the present invention include those described, for example, in U.S. Pat. Nos. 3,218,776; 4,776,455; 4,973,416; 6,479,448; 6,727,215; 6,878,679; 7,259,134; 7,282,472; 7,304,025; 7,329,441; 7,439,215; 7,464,519; 7,595,290; 8,551,929; the disclosures of all of which are incorporated herein by reference in their entireties. In some embodiments, the pouch is a water-soluble, single-chamber pouch, prepared from a water-soluble film. According to one such aspect of the invention, the single-chamber pouch is a formed, sealed pouch produced from a water-soluble polymer or film such as polyvinylalcohol (PVA) or a PVA film.

Preferred water soluble polymers for forming the pouch are polyvinyl alcohol (PVA) resins. The preferred grades have a weight average molecular weight range of about 55,000 to 65,000 and a number average molecular weight range of about 27,000 to 33,000. Preferably, the film material will have a thickness of approximately 3 mil or 75 micrometers. Alternatively, commercial grade PVA films are suitable for use in the present invention.

In various embodiments, the film is desirably strong, flexible, shock resistant, and non-tacky during storage at both high and low temperatures and high and low humidities. In one embodiment, the film is initially formed from polyvinyl acetate, and at least a portion of the acetate functional groups are hydrolyzed to produce alcohol groups. The film may include polyvinyl alcohol (PVOH), and may include a higher concentration of PVOH than polyvinyl acetate. Such films are commercially available with various levels of hydrolysis, and thus various concentrations of PVOH, and in an exemplary embodiment the film initially has about 85 percent of the acetate groups hydrolyzed to alcohol groups. Some of the acetate groups may further hydrolyze in use, so the final concentration of alcohol groups may be higher than the concentration at the time of packaging. The film may have a thickness of from about 25 to about 200 micrometers (μm), or from about 45 to about 100 μm, or from about 75 to about 90 μm in various embodiments.

In some embodiments, the water soluble pouch further comprises a cross-linking agent. In some embodiments, the cross-linking agent is selected from the group consisting of formaldehyde, polyesters, epoxides, isocyanates, vinyl esters, urethanes, polyimides, acrylics with hydroxyl, carboxylic, isocyanate or activated ester groups, bis(methacryloxypropyl)tetramethylsiloxane (styrenes, methylmethacrylates), n-diazopyruvates, phenylboronic acids, cis-platin, divinylbenzene (styrenes, double bonds), polyamides, dialdehydes, triallyl cyanurates, N-(2-ethanesulfonylethyl) pyridinium halides, tetraalkyltitanates, titanates, borates, zirconates, or mixtures thereof. In one embodiment, the cross-linking agent is boric acid or a boric acid salt such as sodium borate.

In additional embodiments, the water-soluble pouch or film from which it is made can contain one or more additional components, agents or features, such as one or more perfumes or fragrances, one or more enzymes, one or more surfactants, one or more rinse agents, one or more dyes, one or more functional or aesthetic particles, and the like. Such components, agents or features can be incorporate into or on the film when it is manufactured, or are conveniently introduced onto the film during the process of manufacturing the liquid composition of the present invention, using methods that are known in the film-producing arts.

The water-soluble container (e.g., pouch) used in association with the present invention may be in any desirable shape and size and may be prepared in any suitable way, such as via molding, casting, extruding or blowing, and is then filled using an automated filling process. Examples of processes for producing and filling water-soluble pouches, suitable for use in accordance with the present invention, are described in U.S. Pat. Nos. 3,218,776; 3,453,779; 4,776,455; 5,699,653; 5,722,217; 6,037,319; 6,727,215; 6,878,679; 7,259,134; 7,282,472; 7,304,025; 7,329,441; 7,439,215; 7,464,519; and 7,595,290; the disclosures of all of which are incorporated herein by reference in their entireties. In preferred embodiments, the pouches are filled with the liquid composition of the present invention using the cavity filling approach described in U.S. Pat. Nos. 3,218,776 and 4,776,455.

In accordance with various embodiments, a single dose pack is formed by encapsulating a wash composition within a container, where the container includes a film. In some embodiments, the film forms one half or more of the container, where the container may also include dyes, print, or other components in some embodiments. The film is water soluble such that the film will completely dissolve when an exterior of the film is exposed to water, such as in a washing machine typically used for laundry. When the film dissolves, the container is ruptured, and the contents are released. As used herein, "water soluble" means at least 2 grams of the solute (the film in one example) will dissolve in 5 liters of solvent (water in one example,) for a solubility of at least 0.4 grams per liter (g/l), at a temperature of 25 degrees Celsius (° C.) unless otherwise specified. Suitable films for packaging are completely soluble in water at temperatures of about 5° C. or greater.

The single dose pack may be formed from a container having a single compartment, but the single dose pack may be formed from containers with two or more different compartments in alternate embodiments. In embodiments with a container having two or more compartments, the contents of the different compartments may or may not the same. In some embodiments, the single dose pack is formulated and configured for cleaning laundry, but other cleaning purposes are also possible. The detergent composition is positioned within the container, and the container is sealed to encase and enclose the wash composition. The detergent composition is typically in direct contact with the film of the container within the single dose pack. The film of the container is sealable by heat, heat and water, ultrasonic methods, or other techniques, and one or more sealing techniques may be used to enclose the wash composition within the container.

In an exemplary embodiment, the single dose pack is sized to provide a desired quantity of wash composition for one load of laundry or one batch of dishes in a dishwasher. The single dose pack may also be sized for a fraction of a desired quantity, such as one half of a load of laundry, so a user can adjust the amount of detergent added without having to split a single dose pack. In an exemplary embodiment, the single dose pack has a weight of from about 15 to about 50 grams. In alternate embodiments, the single dose pack is from about 15 to about 40 grams, or from about 17 to about 30 grams.

The film remains structurally sound and intact prior to use of the single dose pack, where the single dose pack is immersed in a large quantity of water in use. A "large" quantity of water is at least about 100 times the weight of the single dose pack. For example, a single dose pack having a weight of from about 5 to about 50 grams may be immersed in from about 5 to about 50 liters of water in use. As used herein, "structurally sound" means the container and the film do not rupture or leak under typical storage conditions, such as about 0.5 to about 1.5 atmospheres of pressure, temperatures of about −10 to about 35° C., and a relative humidity of about 1 to about 80% for a period of at least 1 week. Structurally sound also means the container and the film are not tacky or sticky to the touch.

In an exemplary embodiment, the detergent composition is liquid when encapsulated within the container. As initially noted, it is desirable that the viscosity of the liquid detergent composition, when diluted with water (at detergent composition to water ratios of about 2:1, or greater dilution) not be excessive, such that the liquid composition is able to fully dissolve in wash water, and further that it does not cause any problems in terms of operation of the washing machine.

"Viscosity" as used herein, means the viscosity measured by a rotational viscometer at a temperature of 25 degrees Celsius (° C.). Accordingly, the as-diluted wash compositions in accordance with the present disclosure preferably have a viscosity of 3,000 centipoise or less, such as from about 50 to about 1,000 centipoise, or from about 50 to about 800 centipoise, or from about 50 to about 600 centipoise. Within this viscosity range, the liquid form facilitates rapid delivery and dispersion of the wash composition once the container ruptures, and this rapid dispersion can aid cleaning. Preferably, the viscosity of the liquid detergents described herein have a viscosity less than 1,000 centipoise (1.0 Pa·s) when 2 parts of the detergent is diluted with one part of water. Most preferably, the viscosity of the liquid detergents described herein have a viscosity less than 500 centipoise (0.5 Pa·s) when 2 parts of the detergent is diluted with one part of water.

Methods of Use

The fabrics and/or garments subjected to a washing, cleaning or textile care processes contemplated herein may be conventional washable laundry, such as household laundry. In some embodiments, the major part of the laundry is garments and fabrics, including but not limited to knits, woven fabrics, denims, non-woven fabrics, felts, yarns, and toweling. The fabrics may be cellulose based such as natural cellulosics, including cotton, flax, linen, jute, ramie, sisal or coir or manmade cellulosics (e.g., originating from wood pulp) including viscose/rayon, ramie, cellulose acetate fibers (tricell), lyocell or blends thereof. The fabrics may also be non-cellulose based such as natural polyamides including wool, camel, cashmere, mohair, rabbit, and silk, or the fabric may be a synthetic polymer such as nylon, aramid, polyester, acrylic, polypropylene and spandex/elastin, or blends of any of the above-mentioned products. Examples of blends are blends of cotton and/or rayon/viscose with one or more companion material such as wool, synthetic fibers (e.g., polyamide fibers, acrylic fibers, polyester fibers, polyvinyl alcohol fibers, polyvinyl chloride fibers, polyurethane fibers, polyurea fibers, aramid fibers), and cellulose-containing fibers (e.g., rayon/viscose, ramie, flax, linen, jute, cellulose acetate fibers, lyocell).

In one embodiment, the fabrics and/or garments are added to a washing machine, and the single dose pack is also added to the washing machine before wash water is added. In an alternate embodiment, the single dose pack may be added to an automatic detergent addition system of a washing machine, where the contents of the single dose pack are added to the wash water with the fabrics and/or garments after the washing process has begun. In yet another embodiment, the single dose pack is manually added to the fabrics and/or garments with the wash water after the washing process has started. The film dissolves and releases the wash composition into the aqueous wash water. The film is dissolved and washes out of the washing machine with the excess wash water, so there is nothing to collect from the fabrics and/or garments after the wash cycle. The fabrics and/or garments are laundered with the wash water and the contents of the single dose pack. The fabrics and/or garments may then be dried and processed as normal.

Fabrics, particularly those containing polyester, washed in the foregoing manner exhibit stain removal performance. Stain removal capability of compositions described herein can be evaluated in accordance with ASTM D4265 -14, the contents of which are incorporated herein by reference. The value of the SRI increases with better washing performance.

A method for finishing textiles using a soil-release protective layer is also described according to the invention, which method comprises the following method steps:

a. providing a unit dose detergent composition containing soil release polymer as described above;
b. exposing the unit dose detergent composition to wash water to dilute the unit dose detergent composition; and
c. bringing a textile into contact with the diluted unit dose detergent composition.

By using or carrying out the method according to the invention, the textiles treated according to the invention are provided with a kind of dirt-repellent protective layer, which effectively reduces or even prevents soiling and facilitates and thus improves the removal of soiling or re-soiling absorbed by the textile.

It is assumed that, using the method, soiling is prevented from penetrating the textiles and at most remains on the surface thereof, and in particular on the protective layer or the protective film thereon. The soiling can be removed very easily from said surface, for example by being separated with part of the protective layer or also with the entire protective layer, and in particular by being washed out. Washing out is promoted in particular by the hydrophilic content of the soil release polymer. The method is simple, can be implemented without great technical effort, and protects the treated textiles from staining. The advantageous effects are achieved for different types of textiles (for example polyester-based textiles and any polyester blended fabric) as well as for different forms of soiling (hydrophilic and hydrophobic soiling).

A further aspect of the present invention also describes the use of a detergent composition containing soil release polymer as disclosed above for reducing re-soiling of textiles and improving the removal of soiling from textiles. These effects are achieved for different types of textiles (for example cotton-based textiles, polyimide-based textiles, polyester-based textiles and blended fabrics but particularly those containing polyester) and different forms of soiling as a result of the detergent composition delivering the soil release polymer that is present in the composition according to the invention.

EXAMPLES

Example 1

The formulations in Table 1 are exemplary of those within the scope of the present disclosure. Similar proportions can be utilized with a free and clear detergent base that does not include fragrance and/or coloring agents.

TABLE 1

| Component | Material Activity % | Formula 1-2 wt. % | Formula 1-3 wt. % | Formula 1-4 wt. % |
|---|---|---|---|---|
| PEG-400 | 100 | 0 | 2 to 5 | 5 to 20 |
| Polyethyleneimine Ethoxylate | 80 | 1 to 4 | 1 to 4 | 1 to 4 |
| Soil Release Polymer | 60.5 | 0.5 to 3.5 | 0.5 to 3.5 | 0.5 to 3.5 |

TABLE 1-continued

| Component | Material Activity % | Formula 1-2 wt. % | Formula 1-3 wt. % | Formula 1-4 wt. % |
|---|---|---|---|---|
| Glycerine | 99 | 9 to 13 | 8 to 13 | 5 to 15 |
| Propylene Glycol | 99 | 5 to 10 | 5 to 10 | 0 to 5 |
| Alcohol Ethoxysulfate Surfactant 25-3 | 60 | 20 to 26 | 20 to 26 | 17 to 26 |
| $C_{12}$-$C_{15}$ Alcohol Ethoxylate 7EO | 100 | 23.1 | 23.1 | 23.1 |
| Coconut Oil Fatty Acid | 100 | 7 to 10 | 8 to 10 | 1.5 to 4.5 |
| Water | 100 | 5.7 | 4 to 8 | 4 to 12 |
| 2-Phenyl Sulfonic Acid (LAS) | 96 | 4 to 8 | 4 to 8 | 4 to 12 |
| Alkanolamine (Monoethanolamine) | 96 | 2.2 to 3.5 | 2.2 to 3.5 | 0.5 to 2.5 |
| Enzymes | 10 | 0.5 to 4 | 0.5 to 4 | 0.5 to 4 |
| Fragrance | 100 | 1 to 3 | 1 to 3 | 1 to 3 |

TABLE 1-continued

| Component | Material Activity % | Formula 1-2 wt. % | Formula 1-3 wt. % | Formula 1-4 wt. % |
|---|---|---|---|---|
| Chelant | 33 | 0 to 1.5 | 0 to 1.5 | 0 to 1.5 |
| Optical Brightener | 100 | 0 to 0.4 | 0 to 0.4 | 0 to 0.4 |
| Bittering Agent | 25 | 0.1 | 0.1 | 0.1 |
| Total | | 100 | 100 | 100 |

Example 2

The liquid detergent formulations in Table 2 were prepared in accordance with standard methods to assess the effect of PEI-EO rheology modifier at various levels. All formulas were free of polyethylene glycol. Formula Z was a comparative formula that did not include either polyethylene glycol or PEI-EO rheology modifiers.

TABLE 2

| Component | Material Activity % | Formula Z wt. % | Formula 2-A wt. % | Formula 2-B wt. % | Formula 2-C wt. % | Formula 2-D wt. % |
|---|---|---|---|---|---|---|
| PEG-400 | 100 | 0 | 0 | 0 | 0 | 0 |
| Polyethyleneimine Ethoxylate | 80 | 0 | 1 | 2 | 3 | 4 |
| Soil Release Polymer (water soluble polyester) | 60.5 | 2 | 2 | 2 | 2 | 2 |
| Glycerin | 99 | 13.9 | 12.9 | 11.9 | 10.9 | 9.9 |
| Propylene Glycol | 100 | 8.2 | 8.2 | 8.2 | 8.2 | 8.2 |
| Alcohol Ethoxysulfate Surfactant 25-3 | 60 | 26 | 26 | 26 | 26 | 26 |
| $C_{12}$-$C_{15}$ Alcohol Ethoxylate 7EO | 99 | 23.1 | 23.1 | 23.1 | 23.1 | 23.1 |
| Coconut Oil Fatty Acid | 100 | 10 | 10 | 10 | 10 | 10 |
| Water | 100 | 5.7 | 5.7 | 5.7 | 5.7 | 5.7 |
| 2-Phenyl Sulfonic Acid (LAS) | 95 | 5.0 | 5.0 | 5.0 | 5.0 | 5.0 |
| Alkanolamine (Monoethanolamine) | 99 | 3.2 | 3.2 | 3.2 | 3.2 | 3.2 |
| Enzymes | 10 | 1.9 | 1.9 | 1.9 | 1.9 | 1.9 |
| Chelant | 34 | 0.9 | 0.9 | 0.9 | 0.9 | 0.9 |
| Optical Brightener | 90 | 0.2 | 0.2 | 0.2 | 0.2 | 0.2 |
| Bittering Agent | 25 | 0.1 | 0.1 | 0.1 | 0.1 | 0.1 |
| Total | | 100 | 100 | 100 | 100 | 100 |

Example 3

The liquid detergent formulations in Table 3 were prepared in accordance with standard methods to assess the effect of PEI-EO and polyethylene glycol rheology modifier at various levels. Formula Z was a comparative formula that did not include either polyethylene glycol or PEI-EO rheology modifiers.

TABLE 3

| Component | Material Activity % | Formula Z wt. % | Formula 3-A wt. % | Formula 3-B wt. % | Formula 3-C wt. % | Formula 3-D wt. % |
|---|---|---|---|---|---|---|
| PEG-400 | 100 | 0 | 2 | 2 | 5 | 5 |
| Polyethyleneimine Ethoxylate | 80 | 0 | 1 | 4 | 4 | 1 |
| Soil Release Polymer (water soluble polyester) | 60.5 | 2 | 2 | 2 | 2 | 2 |

TABLE 3-continued

| Component | Material Activity % | Formula Z wt. % | Formula 3-A wt. % | Formula 3-B wt. % | Formula 3-C wt. % | Formula 3-D wt. % |
|---|---|---|---|---|---|---|
| Glycerin | 99 | 13.9 | 10.9 | 7.9 | 4.9 | 7.9 |
| Propylene Glycol | 99 | 8.2 | 8.2 | 8.2 | 8.2 | 8.2 |
| Alcohol Ethoxysulfate Surfactant 25-3 | 60 | 26 | 26 | 26 | 26 | 26 |
| $C_{12}$-$C_{15}$ Alcohol Ethoxylate 7EO | 100 | 23.1 | 23.1 | 23.1 | 23.1 | 23.1 |
| Coconut Oil Fatty Acid | 100 | 10 | 10 | 10 | 10 | 10 |
| Water | 100 | 5.7 | 5.7 | 5.7 | 5.7 | 5.7 |
| 2-Phenyl Sulfonic Acid (LAS) | 95 | 5.0 | 5.0 | 5.0 | 5.0 | 5.0 |
| Alkanolamine (Monoethanolamine) | 96 | 3.2 | 3.2 | 3.2 | 3.2 | 3.2 |
| Enzymes | 10 | 1.9 | 1.9 | 1.9 | 1.9 | 1.9 |
| Chelant | 34 | 0.9 | 0.9 | 0.9 | 0.9 | 0.9 |
| Optical Brightener | 90 | 0.2 | 0.2 | 0.2 | 0.2 | 0.2 |
| Bittering Agent | 25 | 0.1 | 0.1 | 0.1 | 0.1 | 0.105 |
| Total | | 100 | 100 | 100 | 100 | 100 |

Example 4

Test Method for Dilution Rheology

The detergent composition formulations of Examples 2 and 3 were tested as-is (no dilution) and with additional water (not originally in the formulation) at both 2:1 and 1:1 ratios (of detergent to water). The viscosities of the mixtures and undiluted formulas were measured with a AR2000-EX Rheometer, the shear rate increased from 0.41 to 10 1/s over 5 minutes at 20° C. with a geometry cone of 40 mm, 1:59:49 (degree:min:sec), and a truncation gap of 52 microns. The viscosity is in Pascal*seconds on the vertical axis, where 1 Pa*s is equivalent to 1000 cps, and the horizontal axis shows increasing shear rates in revolutions per second. In cases that dilution rheology is not controlled, a significant increase in viscosity will be observed at the 1:1 and 2:1 dilution versus the as-is formula.

Rheology/Viscosity Results

The table in FIG. 1 illustrates the rheology/viscosity results for the formulations described in Examples 2 and 3. The results were obtained by the test method for dilution rheology described above. As seen from this table, in Formulation Z, where the dilution rheology is not controlled, there is a an almost 100-fold increase in viscosity at the 2:1 dilution (109.76 Pa·s) as compared to the as-is rheology (0.14 Pa·s). In contrast, the rheology of the formulations in which the rheology is controlled shows only a slight increase between the as-is and 2:1 dilution formulations.

It has been observed that it is the alkyl-ether sulfates (AES), such as sodium lauryl ether sulfate (SLES), in a unit dose composition that mainly contributes to the initial increase of viscosity during dilution. FIG. 2 shows the high viscosities and non-Newtonian sheer thinning for a formulation consisting of a mixture of SLES and water in a 7 to 3 ratio by weight. Accordingly, this data supports the idea that the alkyl-ether sulfate (AES), and more specifically, sodium laureth ether sulfate (SLES), contributes to and/or is responsible for the viscosity increase observed during initial dilution in the absence of a rheology modifier.

Accordingly, the present application provides a method for providing unit dose detergent compositions containing SRPs that maintain a consistent, low viscosity profile for enhanced hydration and dissolution. This enables the unit dose detergent to readily dilute and more easily release from the encapsulating polyvinyl alcohol film. This quicker release enables an increase in the exposure time of fabrics to the SRP during the washing cycle, enabling a greater deposition of the SRP and a reduction in the number of washes needed to form an efficacious barrier.

Example 5

Stain removal capability of compositions was evaluated in a wash study in accordance with ASTM D4265-14.

Compositions are shown in Table 4. The soil release polymer was a polyester with 9 units terephthalate, 2 units 5-sulfoisophthalate, 10 units ethylene glycol, 2 units methyl capped PEG (43 EO).

TABLE 4

| Component | Material Activity % | Benchmark wt. % | Formula 5-A wt. % | Formula 5-B wt. % |
|---|---|---|---|---|
| PEG-400 | 100 | 0 | 0 | 1.50 |
| Polyethyleneimine Ethoxylate | 80 | 2.5 | 2.5 | 1.0 |
| Soil Release Polymer (water soluble polyester) | 60.5 | 0 | 2.1 | 2.1 |
| Glycerin | 99 | 11.8 | 11.8 | 11.0 |
| Propylene Glycol | 99 | 6.7 | 6.7 | 6.7 |
| Alcohol Ethoxysulfate Surfactant 25-3 | 60 | 26.0 | 26.0 | 0 |
| $C_{12}$-$C_{15}$ Alcohol Ethoxylate 7EO | 100 | 23.1 | 23.1 | 23.1 |
| Coconut Oil Fatty Acid | 100 | 10.0 | 9.0 | 9.0 |
| Water | 100 | 4.4 | 4.4 | 5.5 |
| 2-Phenyl Sulfonic Acid (LAS) | 95 | 5.0 | 5.0 | 7.6 |
| Sodium Laureth Sulfate | 70 | 0 | 0 | 18.7 |
| Alkanolamine (Monoethanolamine) | 96 | 3.2 | 3.0 | 3.5 |
| Enzymes | 10 | 3.0 | 3.0 | 3.0 |
| Chelant | 34 | 0.9 | 0.9 | 1.5 |
| Optical Brightener | 90 | 0.3 | 0.3 | 0.3 |
| Bittering Agent | 25 | 0.1 | 0.1 | 0.1 |
| Hydrophobically modified Copolymer | 40 | 1.5 | 1.0 | 1.0 |
| Fragrance | | 1.6 | 1.6 | 1.6 |
| Dye | | 0.0 | 0.0 | 0.0 |
| Alcohol | | 0 | 0 | 3.0 |
| Total | | 100 | 100 | 100 |

Washing

Three fabrics (Knitted Poly, Knitted Cotton, and Knitted Poly/Cotton Blend sheets) were prewashed in HE top loaders. The wash water was approximately 90° F. and a ballast composed of 50% cotton and 50% poly sheeting was utilized. 1 ppm chlorine was dosed in wash and rinse. Sheets were pulled after 1×, 3×, 5×, 7×, and 10× washes with a dry cycle in between each wash.

Prewashed sheets were then hand stained on the same day with 4 different stains (dust sebum, beef drippings, HEINZ® MAYOCUE, RAGU® OLD WORLD STYLE® Meat Sauce. Color readings were taken of stains before washing using a spectrophotometer according to ASTM guidelines.

Sheets for each wash timepoint were then washed all together with 24 grams of the various compositions in an HE top loader on normal wash cycle utilizing either 90° F. or 59° F. wash water and a ballast composed of 50% cotton and 50% poly sheeting. 1 ppm chlorine was dosed in wash and rinse. The fabrics were dried per standard ASTM conditions.

Color readings were taken of stains again after washing using the spectrophotometer. ΔE and Stain Removal Index (SRI) was calculated for each stain according to ASTM D4265 guidelines.

An LS Means Tukey HSD Statistical analysis was performed for each stain/fabric/temperature combination using JMP Software at 95% confidence.

Results

SRI for formula 5-A on polyester are shown in Table 5A and SRI for formula 5-B on polyester are shown in Table 5B. Italicized values are those that did not show a statistically significant benefit over the benchmark.

TABLE 5A

| Stain | Polyester Washes | SRI of 5-A @ 59° F. | SRI of 5-A @ 90° F. |
|---|---|---|---|
| Beef Drippings | 1 | *−0.09* | 6.86 |
| | 3 | *−0.09* | 10.43 |
| | 5 | *−1.08* | 7.37 |
| | 7 | *−0.98* | 8.56 |
| | 10 | *−0.61* | 8.94 |
| Dust Sebum | 1 | 6.97 | 8.27 |
| | 3 | 6.27 | 8.02 |
| | 5 | 6.53 | 7.08 |
| | 7 | 5.69 | 6.95 |
| | 10 | 4.69 | 6.50 |
| MAYOCUE | 1 | 4.41 | 2.36 |
| | 3 | 3.76 | 4.00 |
| | 5 | 3.60 | 4.37 |
| | 7 | 2.70 | 3.26 |
| | 10 | 4.29 | 3.54 |
| RAGU w/Meat | 1 | 26.62 | 26.60 |
| | 3 | 29.37 | 31.37 |
| | 5 | 29.74 | 28.07 |
| | 7 | 28.16 | 32.43 |
| | 10 | 26.95 | 30.02 |

TABLE 5B

| Stain | Polyester Washes | SRI of 5-B @ 59° F. | SRI of 5-B @ 90° F. |
|---|---|---|---|
| Beef Drippings | 1 | 1.99 | 2.35 |
| | 3 | 3.83 | 11.54 |
| | 5 | 4.80 | 11.83 |
| | 7 | *2.46* | 10.55 |
| | 10 | 4.06 | 12.34 |
| Dust Sebum | 1 | 6.17 | 7.57 |
| | 3 | 7.46 | 8.75 |
| | 5 | 8.06 | 8.43 |
| | 7 | 6.96 | 8.78 |
| | 10 | 6.21 | 7.58 |
| MAYOCUE | 1 | 4.53 | 3.88 |
| | 3 | 4.41 | 4.50 |
| | 5 | 4.59 | 4.43 |
| | 7 | 3.37 | 3.15 |
| | 10 | 5.53 | 3.94 |
| RAGU w/Meat | 1 | 26.64 | 26.24 |
| | 3 | 29.79 | 31.27 |
| | 5 | 31.49 | 29.20 |
| | 7 | 28.58 | 32.43 |
| | 10 | 27.78 | 30.21 |

SRI of the inventive formula on various stains on polyester fabric at cold and hot wash temperature showed similar performance but with hot water performing slightly better across all stain types. At 90° F., all data points showed statistically better performance than the benchmark. At 59° F., all data points except for beef drippings showed statistically better performance than the benchmark. Results on cotton and cotton blend were not as significant as those on polyester. However, Formula 5-B also performed well on the knitted blend after three washes in hot water.

According to the present invention, by use of the unit dose liquid detergents described herein it may take less than 10 washes, preferably less than 8 washes, less than 6 washes, less than 5 washes, less than 4 washes, less than 3 washes and, even more preferably, less than 2 washes for a SRP protective barrier to form on laundered fabrics and become efficacious on the fabric, in particular on polyester regardless of wash temperature, or on poly blends washed in hot water. Accordingly, in advantageous embodiments, pre-washing of a fabric with SRP is greatly reduced compared to a traditional liquid detergent comprising SRP or pre-washing is not required at all.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It should be understood that various changes may be made in the function and arrangement of elements described in an exemplary embodiment without departing from the scope of the subject matter as set forth in this application.

What is claimed is:

1. A unit dose detergent product comprising:

a unit dose pouch comprising a water soluble film, a liquid detergent encapsulated in the unit dose pouch, wherein the liquid detergent comprises:

a soil release polymer, at least 10% by weight of alkyl-ether sulfate (AES) surfactant;

an ethoxylated polyethyleneimine;

a polyethylene glycol (PEG) polymer having a weight average molecular weight of from about 200 to about 1,000 Daltons; and less than 30% by weight of water, wherein the liquid detergent composition has a first viscosity at 25 degrees Celsius before further dilution with water and a second viscosity at 25 degrees Celsius after dilution with water at a 2:1 ratio of the liquid detergent to water, wherein a ratio of the first viscosity to the second viscosity is about 1:1 to about 1:3.

2. The unit dose detergent product of claim 1, wherein the polyethylene glycol (PEG) polymer has a weight average molecular weight of about 400 Daltons.

3. The unit dose detergent product of claim 1, wherein the soil release polymer is present in an amount from about 0.25 to about 3.5% by weight of the liquid detergent composition.

4. The unit dose detergent product of claim 1, wherein the soil release polymer is a polyester.

5. The unit dose detergent product of claim 1, wherein the ethoxylated polyethyleneimine is present in an amount from about 0.5 to about 5% by weight of the liquid detergent composition.

6. The unit dose detergent product of claim 1, wherein the liquid detergent composition further comprises about 10 to about 30% by weight of a $C_2$ to $C_5$ polyol and about 2 to about 5% by weight of a $C_2$ to $C_5$ alkanolamine.

7. The unit dose detergent product of claim 6, wherein the $C_2$ to $C_5$ polyol is a mixture of glycerin and propylene glycol, and wherein a ratio of glycerin to propylene glycol in the liquid detergent composition is within 2:1 to 1:2.

8. The unit dose detergent product of claim 7, wherein glycerin is present in an amount from about 5 to about 15% by weight of the liquid detergent composition.

9. The unit dose detergent product of claim 1, wherein the liquid detergent composition further comprises a linear alkylbenzene sulfonate and a fatty alcohol ethoxylate.

10. The unit dose detergent product of claim 9, wherein the alkyl-ether sulfate, the linear alkyl benzene sulfonate, and the fatty alcohol ethoxylate are present in a weight ratio of about (2 to 5):1:(3 to 10) in the composition.

11. A liquid detergent composition comprising:

a soil release polymer, at least 10% by weight of an alkyl-ether sulfate;

a polyethylene glycol (PEG) polymer in an amount of about to about 2 to about 5% by weight of the liquid detergent composition;

an alkoxylated polyamine; and less than 30% by weight of water, wherein a weight ratio of the polyethylene glycol (PEG) polymer to the alkoxylated polyamine is from about 10:1 to about 1:10; and wherein the liquid detergent composition has a first viscosity at 25 degrees Celsius before further dilution with water and a second viscosity at 25 degrees Celsius after dilution with water at a 2:1 ratio of the liquid detergent to water, wherein a ratio of the first viscosity to the second viscosity is about 1:1 to about 1:3.

12. The unit dose detergent product of claim 11, wherein the alkoxylated polyamine is an ethoxylated polyethyleneimine.

13. The liquid detergent composition of claim 11, wherein the soil release polymer is present in an amount from about 0.25 to about 3.5% by weight of the liquid detergent composition.

14. The liquid detergent composition of claim 11, wherein the soil release polymer is a nonionic water soluble polyester or a polyester having repeat units formed from alkylene terephthalate units, containing 10%-30% by weight of alkylene terephthalate units together with 90%-70% by weight of polyoxyethylene terephthalate units which derive from a polyoxyethylene glycol having a mean molecular weight of 300-8000.

15. The liquid detergent composition of claim 11, further comprising at least one additional component selection from a group consisting of:

a $C_2$ to $C_5$ poylol, a $C_2$ to $C_5$ alkanolamine, an active enzyme, a whitening agent, a bittering agent, a linear alkylbenzene sulfonate, and a fatty alcohol ethoxylate.

16. A method for reducing the number of washes needed to form a soil release polymer barrier on a fabric by a unit dose detergent composition comprising the steps of:

providing a liquid detergent composition comprising:

a soil release polymer, at least 10% by weight of an alkyl-ether sulfate;

an alkoxylated polyamine;

polyethylene glycol having a weight average molecular weight of from about 300 to about 500 Daltons; and less than a 30% by weight of water, encapsulating the liquid detergent composition in a pouch made of water soluble film; and washing the fabric with the encapsulated liquid detergent composition, wherein the liquid detergent composition has a first viscosity at 25 degrees Celsius before further dilution with water and a second viscosity at 25 degrees Celsius after dilution with water at a 2:1 ratio of the liquid detergent to water, wherein a ratio of the first viscosity to the second viscosity is about 1:1 to about 1:3.

17. The method of claim 16, wherein the alkoxylated polyamine is an ethoxylated polyethyleneimine present in an amount from about 0.5 to about 5% by weight of the liquid detergent composition.

18. The method of claim 16, wherein the soil release polymer is a nonionic water-soluble polyester.

* * * * *